United States Patent
McCormack et al.

(10) Patent No.: US 9,473,207 B2
(45) Date of Patent: Oct. 18, 2016

(54) CONTACTLESS EHF DATA COMMUNICATION

(71) Applicant: Keyssa, Inc., Mountain View, CA (US)

(72) Inventors: Gary D. McCormack, Tigard, OR (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 137 days.

(21) Appl. No.: 14/215,074

(22) Filed: Mar. 17, 2014

(65) Prior Publication Data

US 2014/0273837 A1 Sep. 18, 2014

Related U.S. Application Data

(60) Provisional application No. 61/799,567, filed on Mar. 15, 2013.

(51) Int. Cl.
*H04B 5/00* (2006.01)
*H02J 17/00* (2006.01)

(52) U.S. Cl.
CPC .............. *H04B 5/0031* (2013.01); *H02J 17/00* (2013.01); *H02J 50/10* (2016.02); *H02J 50/80* (2016.02); *H04B 5/0037* (2013.01)

(58) Field of Classification Search
CPC .... H04B 5/0031; H04B 5/0037; H02J 17/00
USPC ........... 455/41.1, 41.2, 91, 102, 73; 307/104
See application file for complete search history.

(56) References Cited

U.S. PATENT DOCUMENTS

| | | |
|---|---|---|
| 2,753,551 A | 7/1956 | Richmond |
| 3,971,930 A | 7/1976 | Fitzmaurice et al. |
| 4,485,312 A | 11/1984 | Kusakabe et al. |
| 5,621,913 A | 4/1997 | Tuttle et al. |
| 5,754,948 A | 5/1998 | Metze |
| 5,921,783 A | 7/1999 | Fritsch et al. |
| 5,941,729 A | 8/1999 | Sri-Jayantha |
| 6,351,237 B1 | 2/2002 | Martek et al. |

(Continued)

FOREIGN PATENT DOCUMENTS

| | | |
|---|---|---|
| EP | 2106192 A2 | 9/2009 |
| EP | 2309608 A1 | 4/2011 |

(Continued)

OTHER PUBLICATIONS

L. L. Goldstone, "MM Wave Transmission Polarizer", International Symposium Digest—Antennas & Propagation vol. 2, Jun. 1979, 5 pages.

(Continued)

*Primary Examiner* — Tuan Pham
(74) *Attorney, Agent, or Firm* — Fenwick & West LLP

(57) ABSTRACT

An electronic device may include an auxiliary circuit providing an operative function, a data signal circuit, and an extremely high frequency (EHF) wireless transmitter. The auxiliary circuit may produce a first low frequency data signal. The data signal circuit may be coupled to the auxiliary circuit for encoding a first composite data signal including the first low frequency data signal and the first base high frequency data signal. The EHF wireless transmitter may transmit the first encoded composite data signal to an external device over a wireless EHF communication link. The transmitted encoded composite data signal may have a predefined rate of carrier modulation.

27 Claims, 19 Drawing Sheets

(56) References Cited

U.S. PATENT DOCUMENTS

| | | |
|---|---|---|
| 6,607,136 B1 | 8/2003 | Atsmon et al. |
| 6,967,347 B2 | 11/2005 | Estes et al. |
| 7,311,526 B2 | 12/2007 | Rohrbach et al. |
| 7,517,222 B2 | 4/2009 | Rohrbach et al. |
| 7,598,923 B2 | 10/2009 | Hardacker et al. |
| 7,599,427 B2 | 10/2009 | Bik |
| 7,612,630 B2 | 11/2009 | Miller |
| 7,645,143 B2 | 1/2010 | Rohrbach et al. |
| 7,664,461 B2 | 2/2010 | Rofougaran et al. |
| 7,761,092 B2 | 7/2010 | Desch et al. |
| 7,791,167 B1 | 9/2010 | Rofougaran |
| 7,889,022 B2 | 2/2011 | Miller |
| 7,929,474 B2 | 4/2011 | Pettus et al. |
| 8,041,227 B2 | 10/2011 | Holcombe et al. |
| 8,063,769 B2 | 11/2011 | Rofougaran |
| 8,081,699 B2 | 12/2011 | Siwiak et al. |
| 8,087,939 B2 | 1/2012 | Rohrbach et al. |
| 8,121,542 B2 | 2/2012 | Zack et al. |
| 8,339,258 B2 | 12/2012 | Rofougaran |
| 2006/0038168 A1 | 2/2006 | Estes et al. |
| 2006/0051981 A1 | 3/2006 | Neidlein et al. |
| 2006/0159158 A1 | 7/2006 | Moore et al. |
| 2007/0024504 A1 | 2/2007 | Matsunaga |
| 2007/0156204 A1* | 7/2007 | Denker ............ A61N 1/3787 607/61 |
| 2008/0055093 A1 | 3/2008 | Shkolnikov et al. |
| 2008/0077188 A1* | 3/2008 | Denker ............ A61N 1/372 607/17 |
| 2008/0197973 A1 | 8/2008 | Enguent |
| 2008/0293446 A1 | 11/2008 | Rofougaran |
| 2009/0098826 A1 | 4/2009 | Zack et al. |
| 2009/0111390 A1 | 4/2009 | Sutton et al. |
| 2009/0175323 A1 | 7/2009 | Chung |
| 2009/0218407 A1 | 9/2009 | Rofougaran |
| 2009/0218701 A1 | 9/2009 | Rofougaran |
| 2009/0239392 A1 | 9/2009 | Sumitomo et al. |
| 2009/0239483 A1 | 9/2009 | Rofougaran |
| 2009/0280765 A1 | 11/2009 | Rofougaran et al. |
| 2010/0009627 A1 | 1/2010 | Huomo |
| 2010/0120406 A1 | 5/2010 | Banga et al. |
| 2010/0149149 A1 | 6/2010 | Lawther |
| 2010/0159829 A1 | 6/2010 | McCormack |
| 2010/0202499 A1 | 8/2010 | Lee et al. |
| 2010/0231452 A1 | 9/2010 | Babakhani et al. |
| 2010/0285634 A1 | 11/2010 | Rofougaran |
| 2010/0297954 A1 | 11/2010 | Rofougaran et al. |
| 2011/0044404 A1 | 2/2011 | Vromans |
| 2011/0092212 A1 | 4/2011 | Kubota |
| 2011/0127954 A1 | 6/2011 | Walley et al. |
| 2011/0286703 A1 | 11/2011 | Kishima et al. |
| 2012/0009880 A1 | 1/2012 | Trainin et al. |
| 2012/0028582 A1 | 2/2012 | Tandy |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0319496 A1 | 12/2012 | McCormack et al. |
| 2013/0106673 A1 | 5/2013 | McCormack et al. |
| 2013/0109303 A1 | 5/2013 | McCormack et al. |
| 2013/0157477 A1 | 6/2013 | McCormack |
| 2013/0183903 A1 | 7/2013 | McCormack et al. |
| 2013/0196598 A1 | 8/2013 | McCormack et al. |
| 2013/0308501 A1 | 11/2013 | McCormack et al. |
| 2014/0092503 A1* | 4/2014 | Ostrovsky ............ H02H 1/0015 361/45 |

FOREIGN PATENT DOCUMENTS

| | | |
|---|---|---|
| EP | 2328226 A1 | 6/2011 |
| GB | 817349 | 7/1959 |
| JP | 2003209511 A | 7/2003 |
| WO | 97/32413 A1 | 9/1997 |
| WO | 2011/114737 A1 | 9/2011 |
| WO | 2011/114738 A1 | 9/2011 |
| WO | 2012/174350 A1 | 12/2012 |
| WO | 2013/059801 A1 | 4/2013 |
| WO | 2013/059802 A1 | 4/2013 |
| WO | 2013/090625 A1 | 6/2013 |
| WO | 2013/131095 A2 | 9/2013 |

OTHER PUBLICATIONS

Vahle Electrification Systems, "CPS Contactless Power System", Catalog No. 9d/E, 2004, 12 pages.

Ecma International, "Standard ECMA—398: Close Proximity Electric Induction Wireless Communications", Internet citation, Jun. 1, 2011, pp. 1-99.

Jonas Ribbe, Authorized Officer, European Patent Office, "International Search Report" in connection with related PCT Patent Application No. PCT/US2014/030732, dated Jul. 1, 2014, 3 pages.

Jonas Ribbe, Authorized Officer, European Patent Office, "Written Opinion of the International Searching Authority" in connection with related PCT Patent Application No. PCT/US2014/030732, dated Jul. 1, 2014, 6 pages.

PCT International Search Report and Written Opinion, PCT Application No. PCT/US2014/030116, Sep. 23, 2014, 15 pages.

* cited by examiner

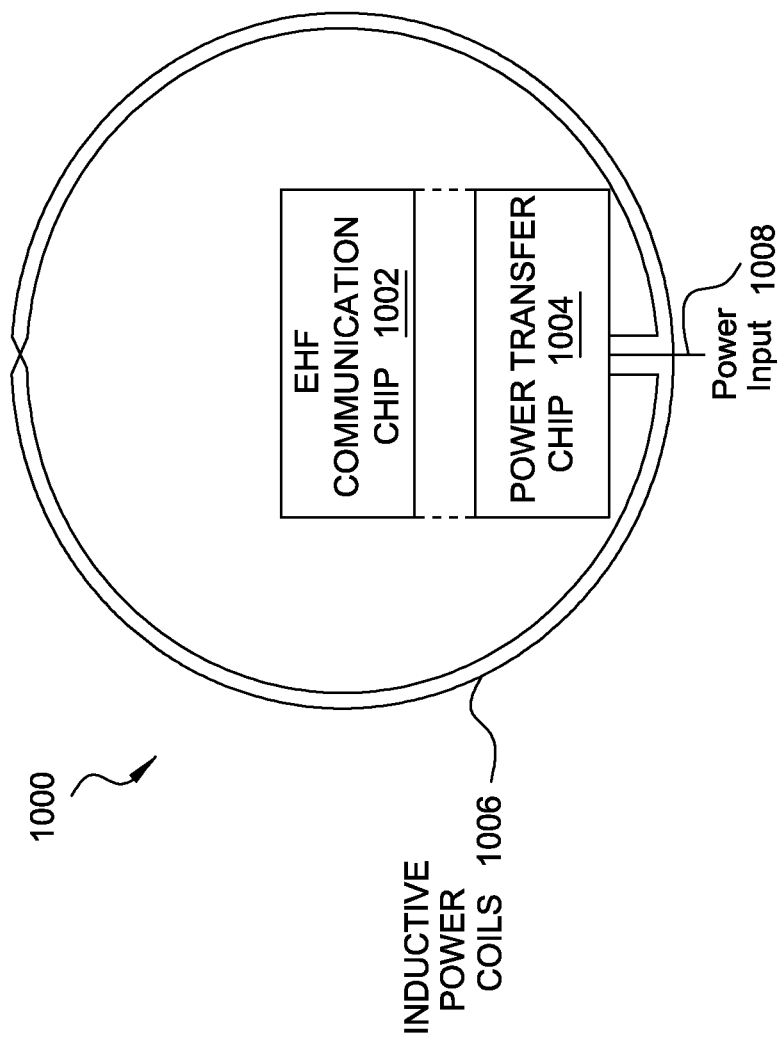

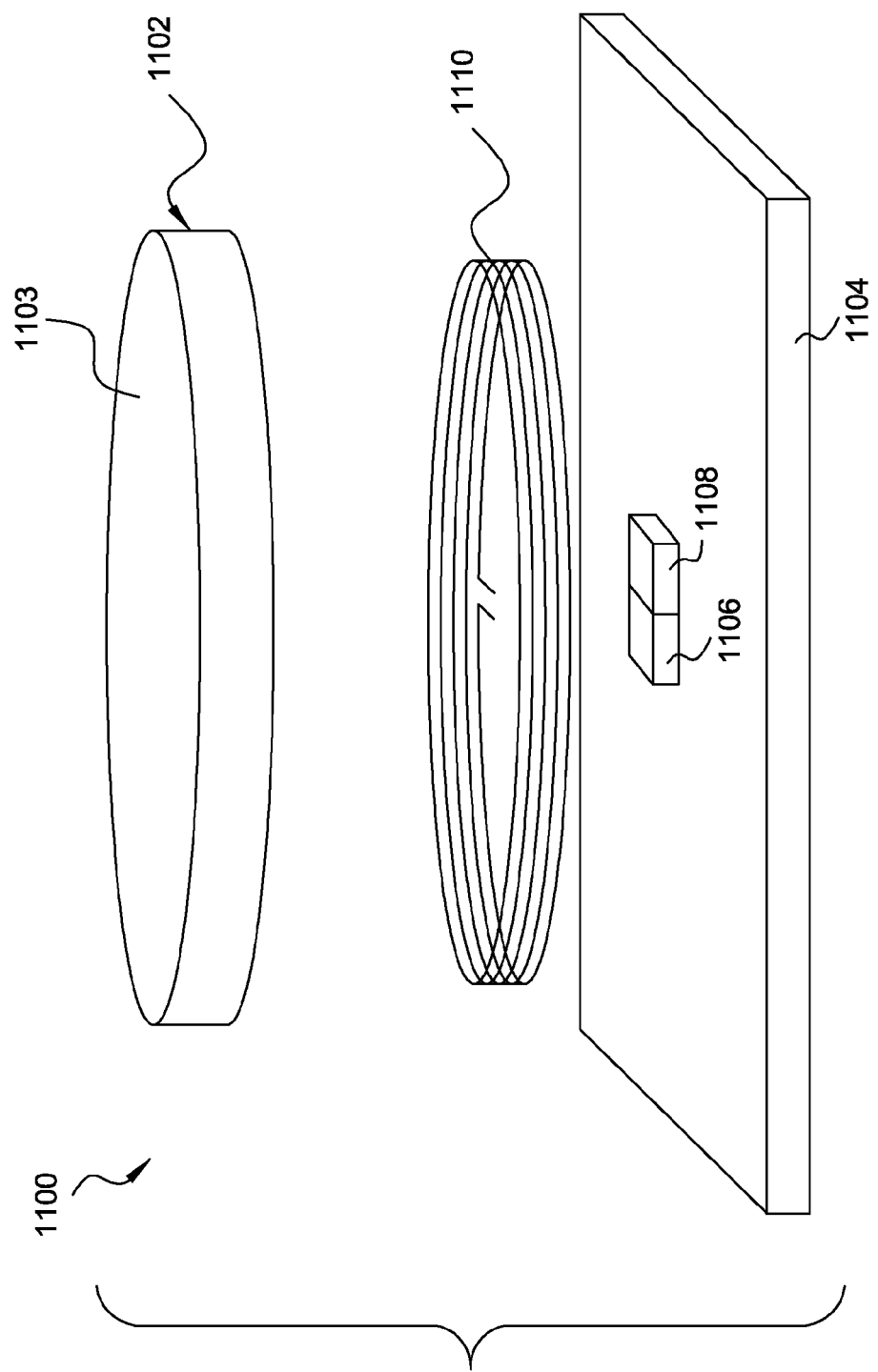

CONTACTLESS EHF DATA COMMUNICATION

CROSS-REFERENCES TO RELATED APPLICATION

The present application claims the benefit under 35 U.S.C. §119(e) of U.S. Provisional Patent Application Ser. No. 61/799,567 for CONTACTLESS DATA AND POWER TRANSFER, filed Mar. 15, 2013, which is hereby incorporated by reference in its entirety for all purposes.

TECHNICAL FIELD

This disclosure relates to data transfer using contactless extremely high frequency (EHF) communication. In one aspect, the disclosure relates to communicating low frequency and high frequency data signals combined into a composite data signal over a wireless EHF communication link.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. Some of these electronic products can not only provide mobile voice communication between users, but also exchange data.

Apart from communicating at a high data rate which requires transmission of high frequency signals, communicating information associated with device related auxiliary components requires transmitting and/or receiving low frequency signals over additional communication links. With wired interconnections between devices, the additional communication links are in the form of additional wires that are dedicated to carrying the various signals.

BRIEF SUMMARY

In a first example, an electronic device may include an auxiliary circuit providing an operative function, a first data signal circuit, and an EHF wireless transmitter. The auxiliary circuit may produce a first low frequency data signal. The first data signal circuit may be coupled to the auxiliary circuit for encoding a first composite data signal with the first low frequency data signal and a first base high frequency data signal. The EHF wireless transmitter may transmit the first encoded composite data signal to an external device over a first wireless EHF communication link. The transmitted encoded composite data signal may have a predefined rate of carrier modulation.

In a second example, an electronic device may include an auxiliary circuit, an EHF wireless receiver, and a first data signal circuit. The auxiliary circuit may provide an operative function in response to a received low frequency data signal. The EHF wireless receiver may receive an encoded composite data signal with a low frequency data signal and a base high frequency data signal over a wireless EHF communication link from an external electronic device. The first data signal circuit may be coupled to the auxiliary circuit and EHF wireless receiver for decoding the encoded composite data signal into the low frequency data signal and the base high frequency data signal, and communicating the low frequency data signal to the auxiliary circuit.

In a third example, an electronic device may include a power transfer circuit, a first circuit module, and a second circuit module. The power transfer circuit may include an inductive coil for providing contactless power transfer between the electronic device and an external device. The power transfer may be controlled by a low-frequency power control signal produced or received by the power transfer circuit. The first circuit module may be configured to receive the low frequency power control signal produced by the power transfer circuit and an input base high frequency data signal. The first circuit module may include a first data signal circuit responsive to the power control signal produced by the power transfer circuit and the input base high frequency data signal for encoding a composite data signal with the low-frequency power control signal and the input base high frequency data signal. In addition, the first circuit module may include an EHF wireless transmitter for transmitting over a first wireless EHF communication link the first encoded composite data signal to the external device. The transmitted encoded composite data signal may have a predefined rate of carrier modulation. The second circuit module may be configured to output the low frequency power control signal and an output base high frequency data signal.

The second circuit module may include an EHF wireless receiver for receiving a second encoded composite data signal with a received low frequency power control signal and an output base high frequency data signal over a second wireless EHF communication link from the external device. In addition, the second circuit module may include a second data signal circuit coupled to a power transfer circuit for decoding the second encoded composite data signal into the received low frequency power control signal and the output base high frequency data signal, and communicating the received low frequency power control signal to the power transfer circuit.

A method for concurrently transferring power and transmitting data may include producing a first low frequency data signal by an auxiliary circuit providing an operative function for the electronic device, receiving the first low frequency data signal and a first base high frequency data signal by a first data signal circuit, encoding a first composite data signal with the first low frequency data signal and the first base high frequency data signal, and transmitting the first encoded composite data signal to an external device over a first wireless EHF communication link. The transmitted encoded composite data signal may have a predefined rate of carrier modulation.

In a further example, a mating assembly may include a frame defining four side elements defining a channel, and a first electronic insert. The first electronic insert may be positioned in the frame and in contact with at least portions of three of the side elements. The first electronic insert may include a first printed circuit substrate, a first EHF wireless transceiver coupled to a first data signal circuit disposed on the first printed circuit substrate, and a first dielectric cover mounted to the first printed circuit substrate and defining an interface surface extending along the first EHF wireless transceiver and the first inductive power coil. The first EHF wireless transceiver may be configured to transmit and receive EHF wireless signals along a first signal pathway extending through the dielectric cover. The first inductive power coil may be configured to receive or transmit power along a first power pathway extending through the first dielectric cover. The frame and the first dielectric cover may define a portion of the channel into which a second electronic insert may be positioned for communication and power transfer with the first electronic insert. In addition, at least one of the frame and the first electronic insert may include a first protrusion defining a first end position for the second electronic insert when the second electronic insert is positioned in the portion of the channel.

In another example, a mating assembly may include a frame defining four side elements defining a channel, a first electronic insert, and a second electronic insert. The first electronic insert may be positioned in the frame and in contact with at least portions of three of the side elements. The second electronic insert may also be positioned in the frame. Each of the first electronic insert and the second electronic insert may include a printed circuit substrate, a power transfer circuit including an inductive power coil disposed on the printed circuit substrate, a data signal circuit disposed on the printed circuit substrate, an EHF wireless transceiver disposed on the printed circuit substrate, and a dielectric cover mounted to the printed circuit substrate and defining an interface surface extending along the EHF wireless transceiver and the inductive power coil. The EHF wireless transceiver may be configured to transmit and receive EHF wireless signals along a signal pathway extending through the dielectric cover. The inductive power coil may be configured to receive or transmit power along a power pathway also extending through the dielectric cover. The first electronic insert and the second electronic insert may be positioned for communication and power transfer with one another.

BRIEF DESCRIPTION OF THE DRAWINGS

Figure 1:
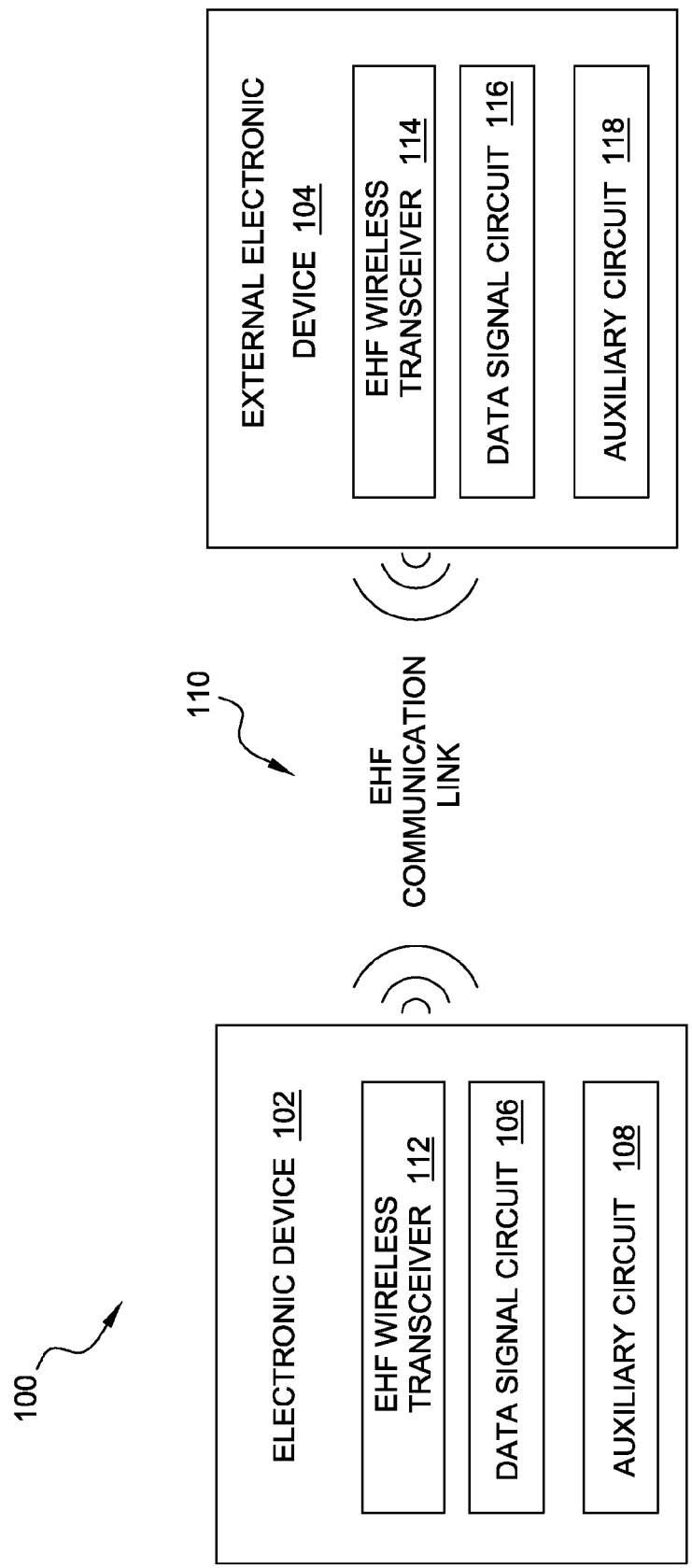
Figure 2:
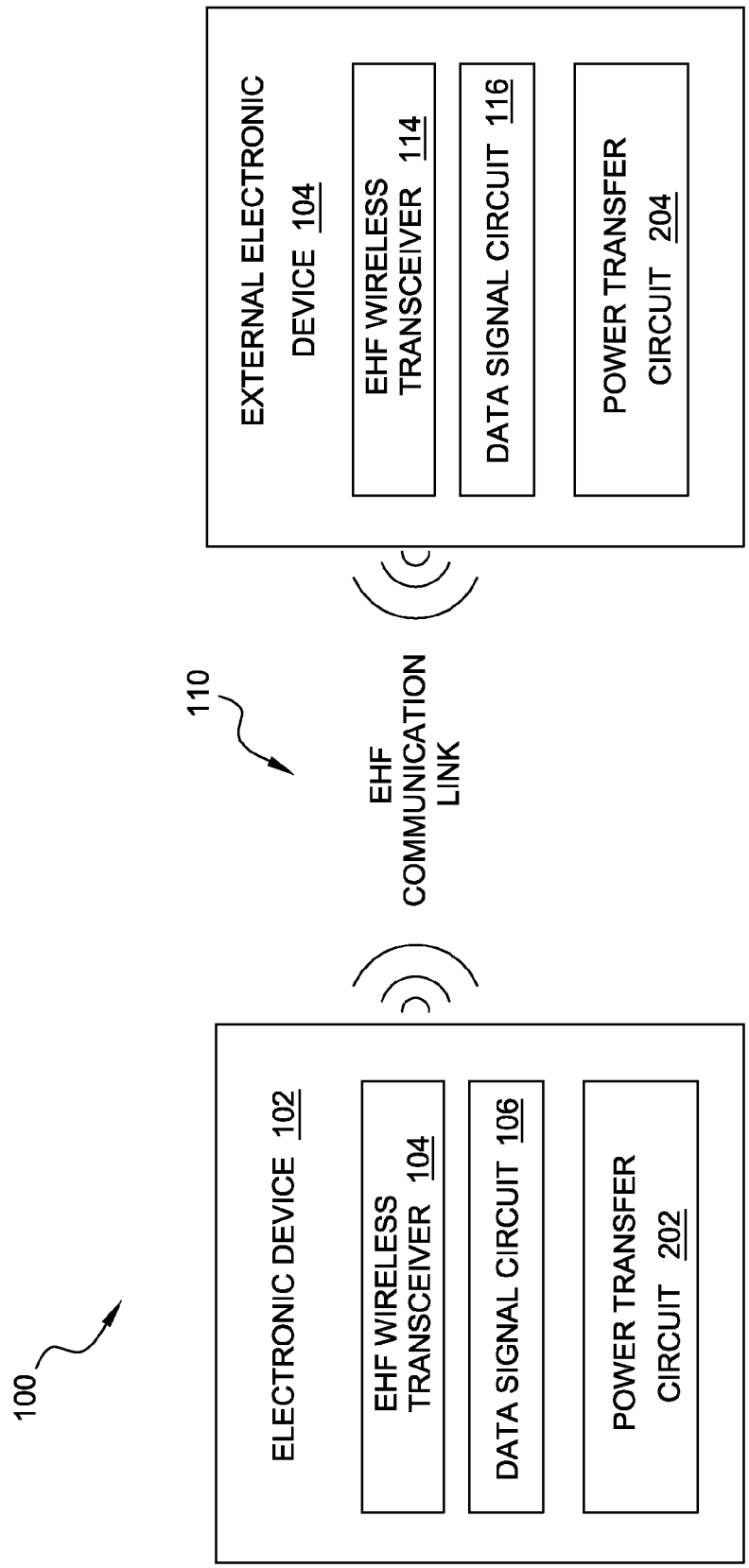
Figure 3:
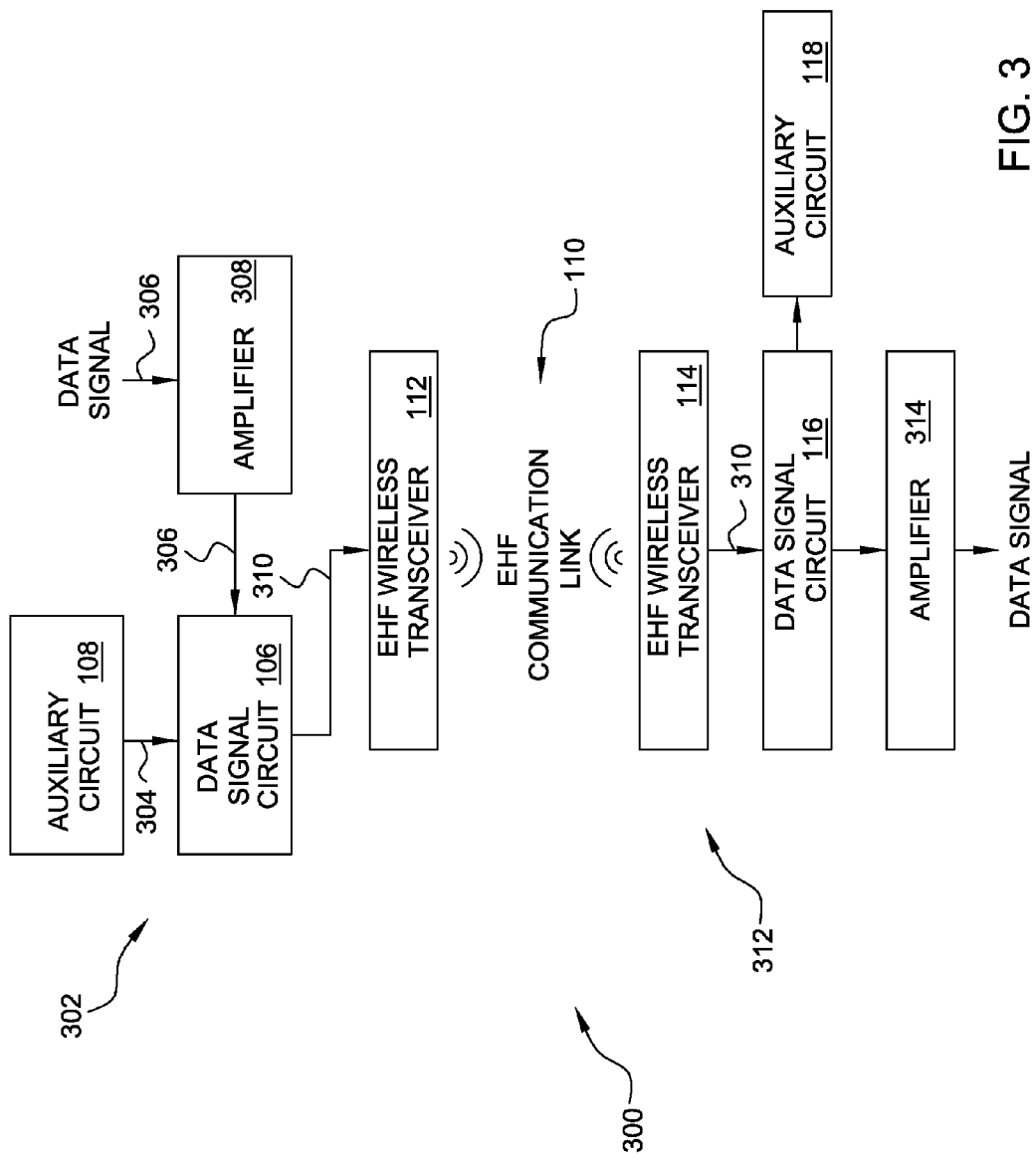
Figure 4A:
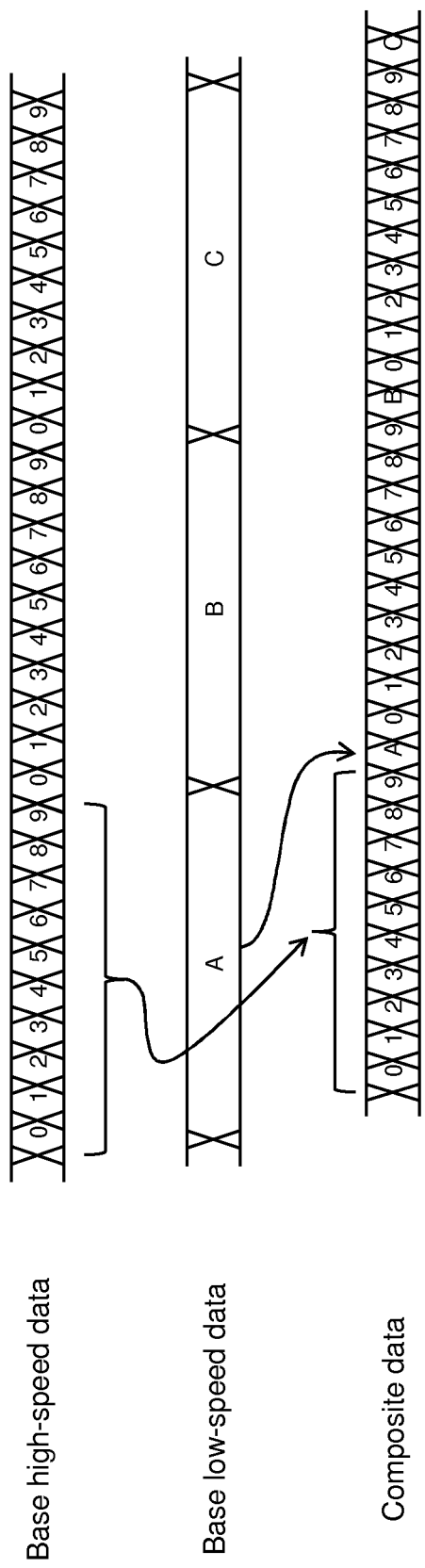
Figure 4B:
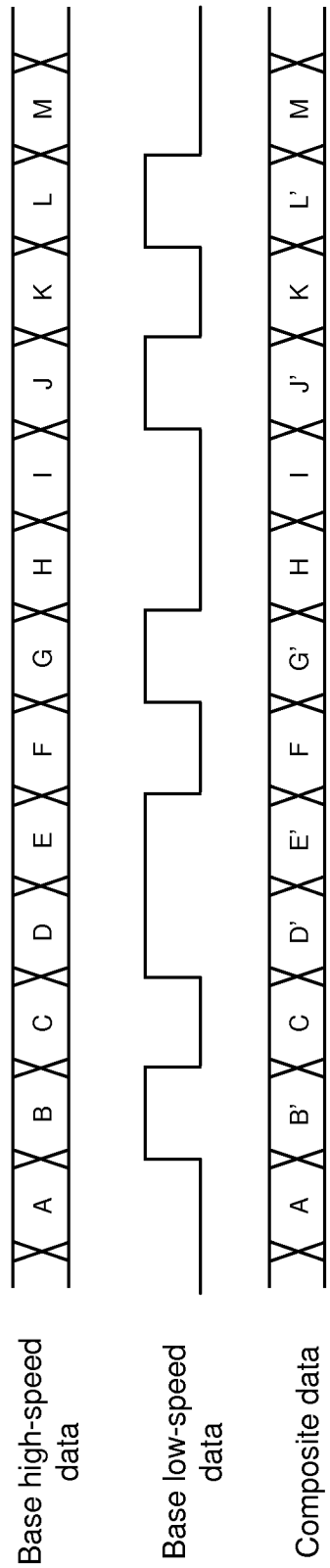

Having thus described the invention in general terms, reference will now be made to the accompanying drawings, which are not necessarily drawn to scale, and wherein:

FIG. 1 is a block diagram of an example of a first electronic device communicating with a second electronic device;

FIG. 2 is a block diagram of an example of a third electronic device communicating with a fourth electronic device;

FIG. 3 is a block diagram illustrating an example of the flow of data signals in various components of electronic devices during communication;

FIG. 4A shows sample data signals of a base high speed data signal, a low speed data signal, and a composite data signal;

FIG. 4B illustrates an exemplary scheme for incorporating low-speed data within the protocol of the high-speed data without altering the rate from the original high-speed base signal.

Figure 4C:
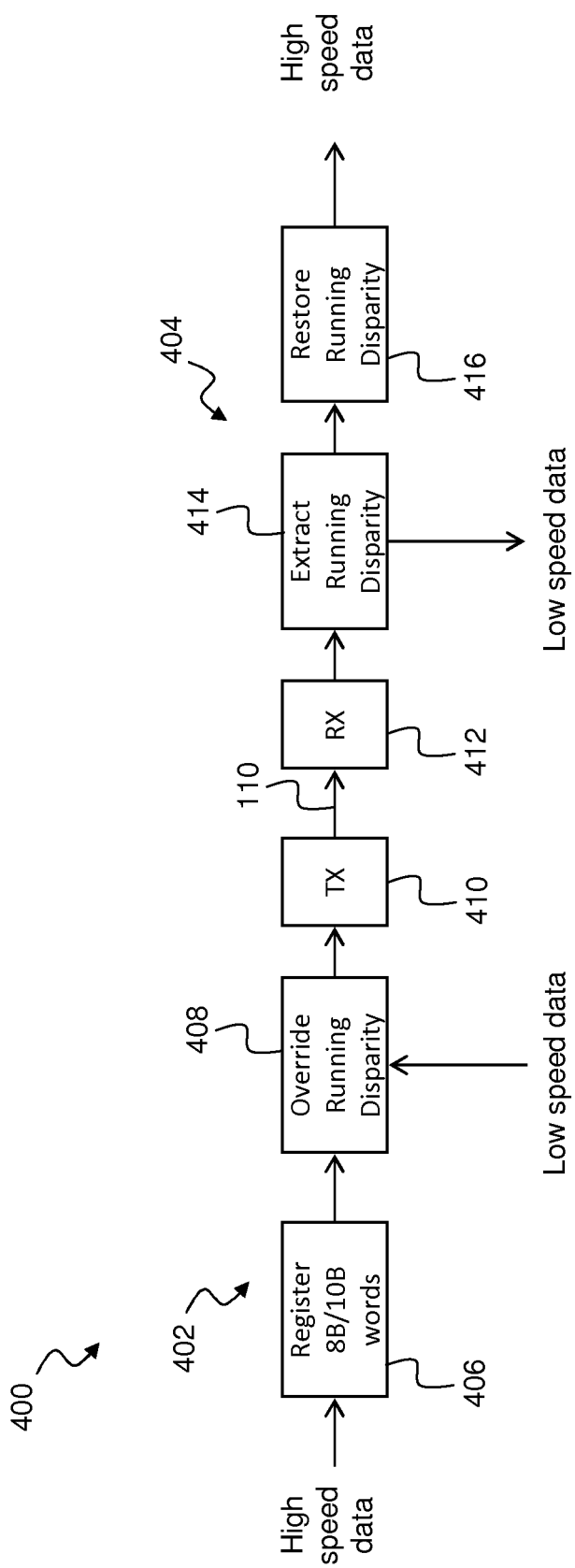

FIG. 4C is an exemplary block diagram illustrating a transmitter configured to incorporate low-speed data within encoded high-speed data and a receiver configured to extract the low-speed data from the encoded high-speed data.

Figure 5:
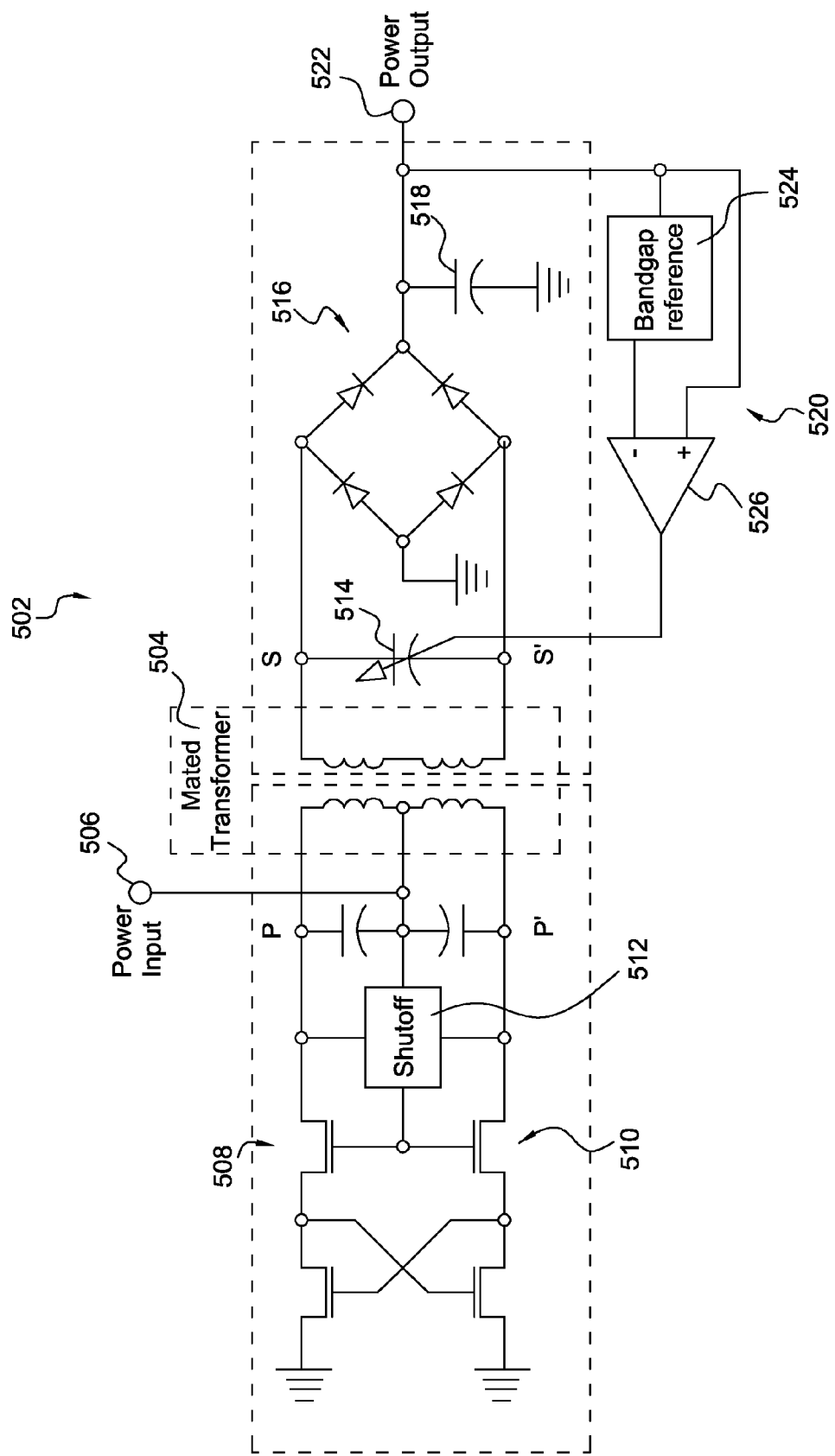
Figure 6:
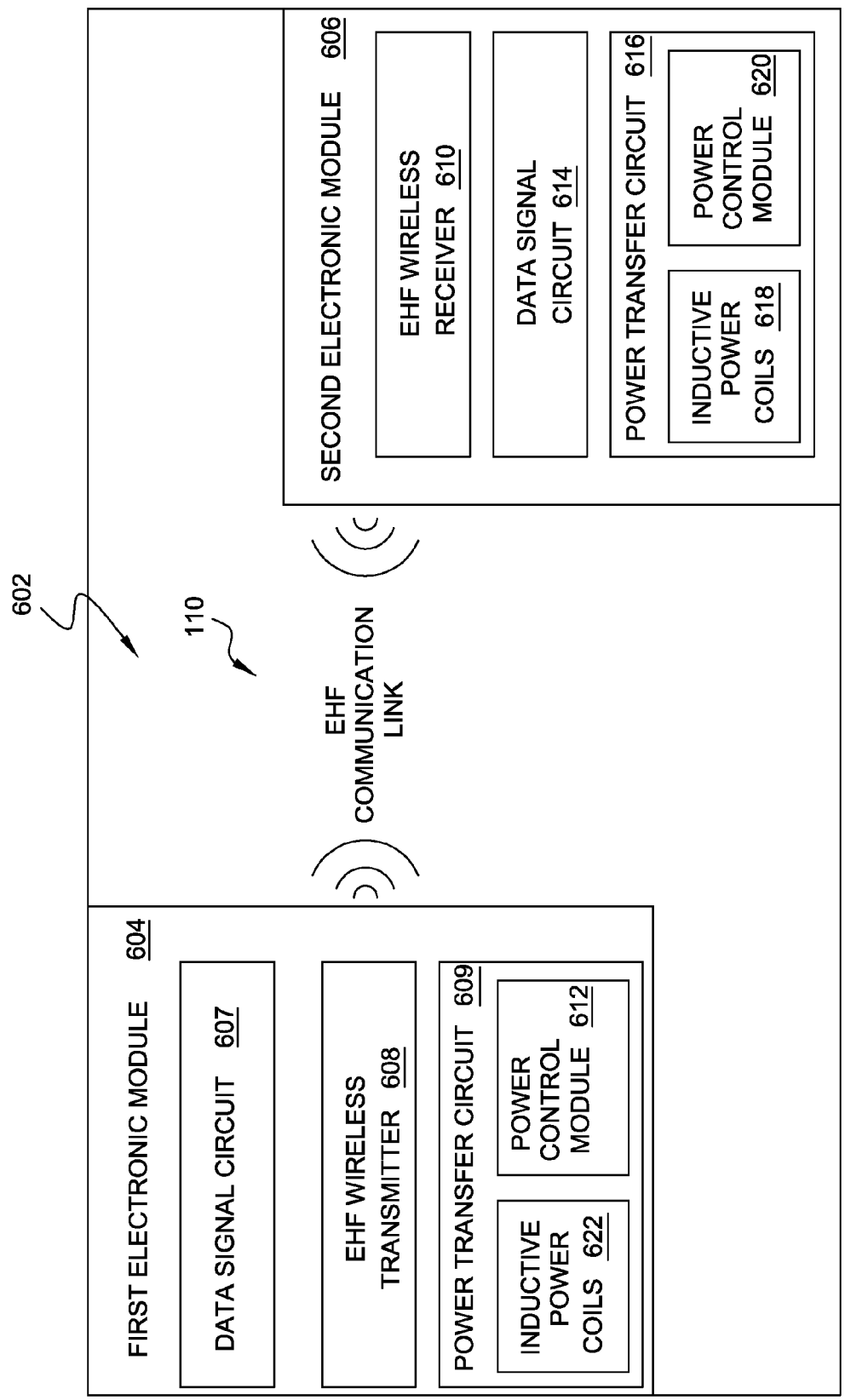
Figure 7:
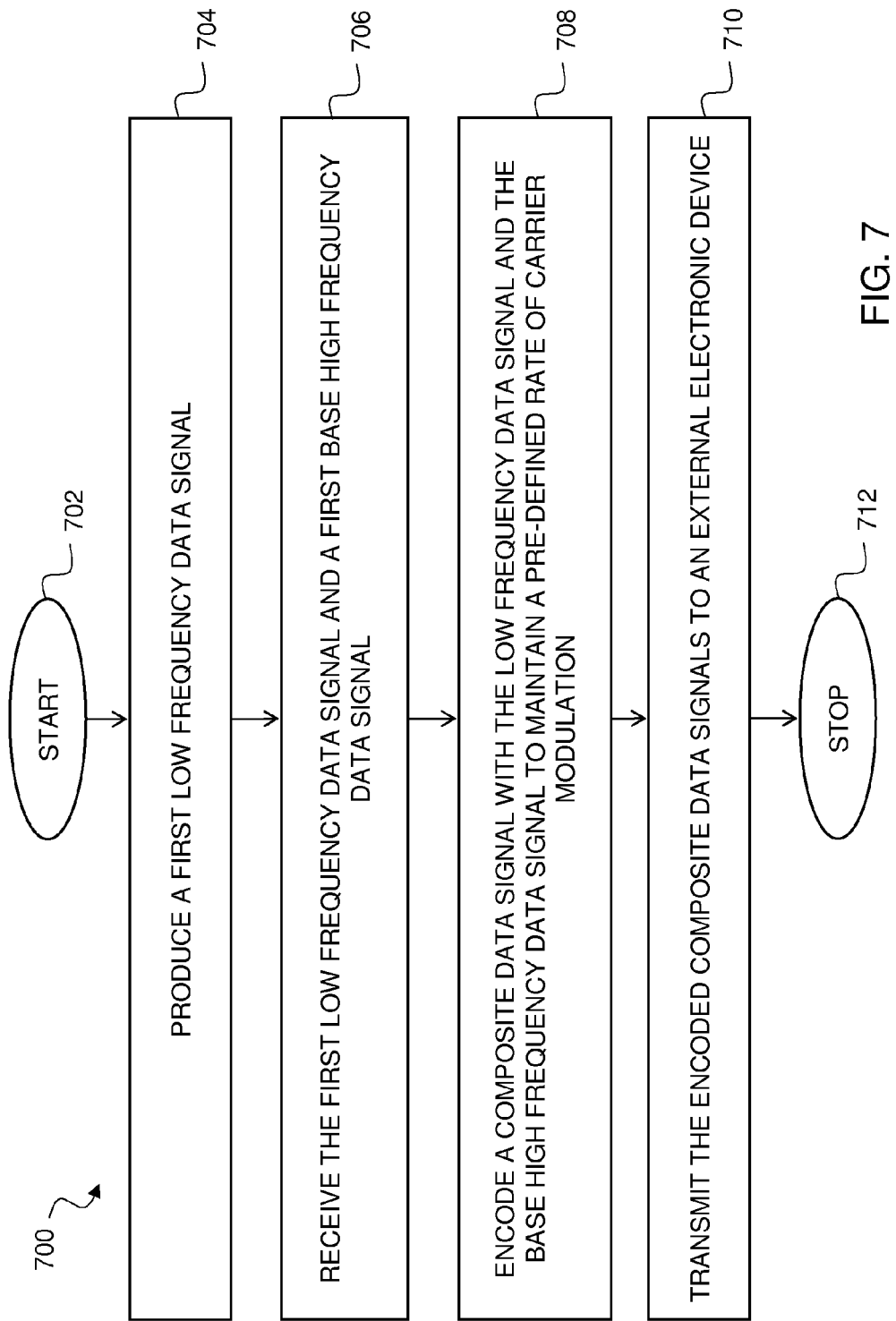
Figure 8:
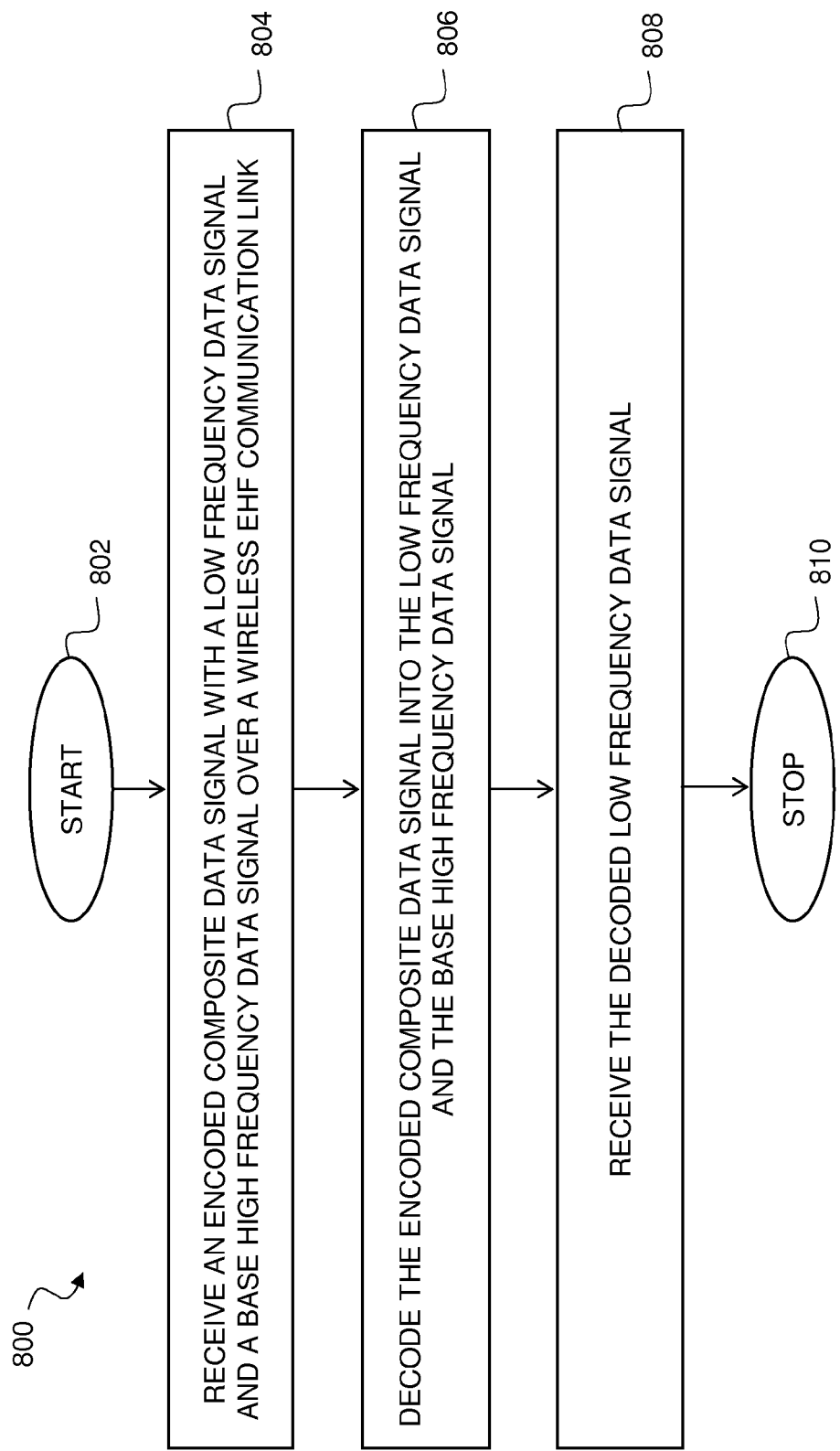
Figure 9:
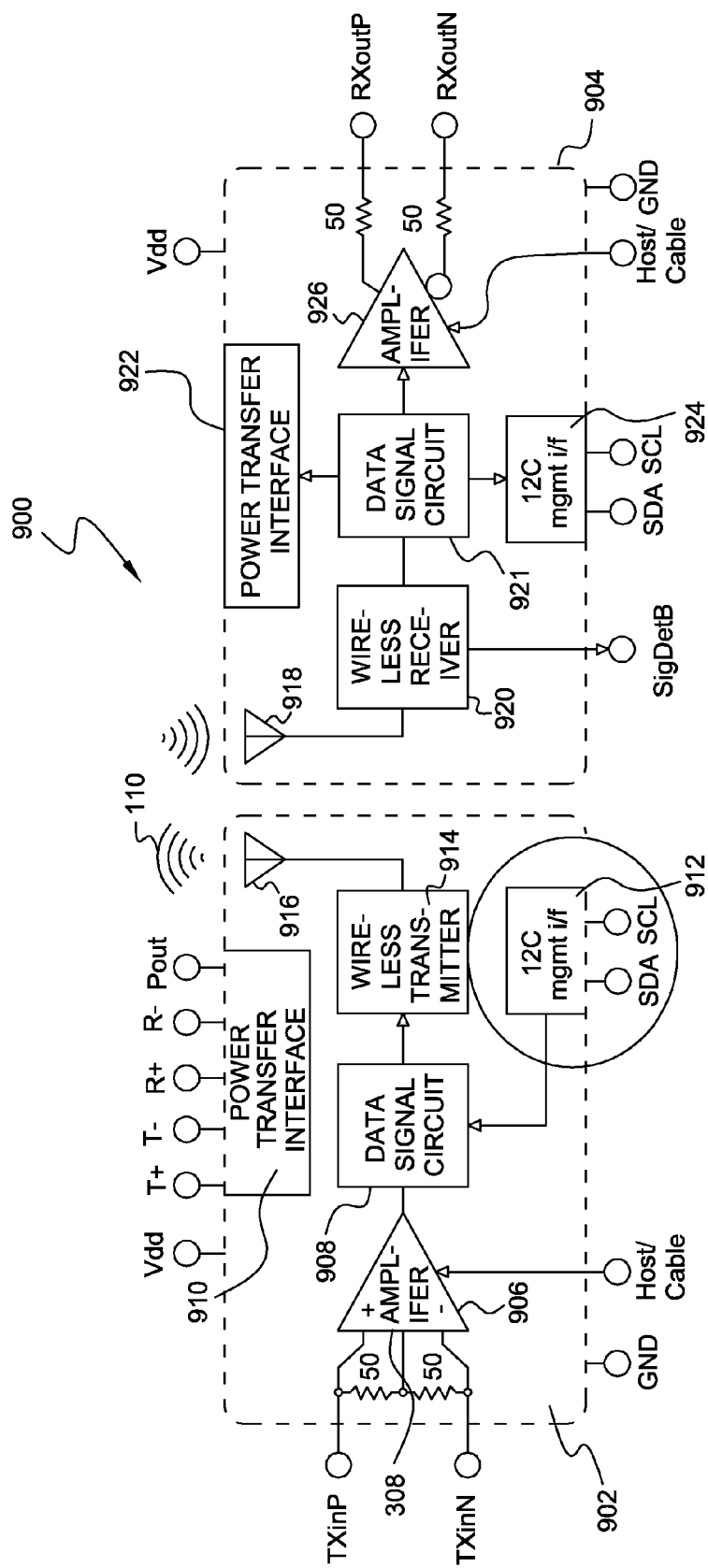
Figure 10B:
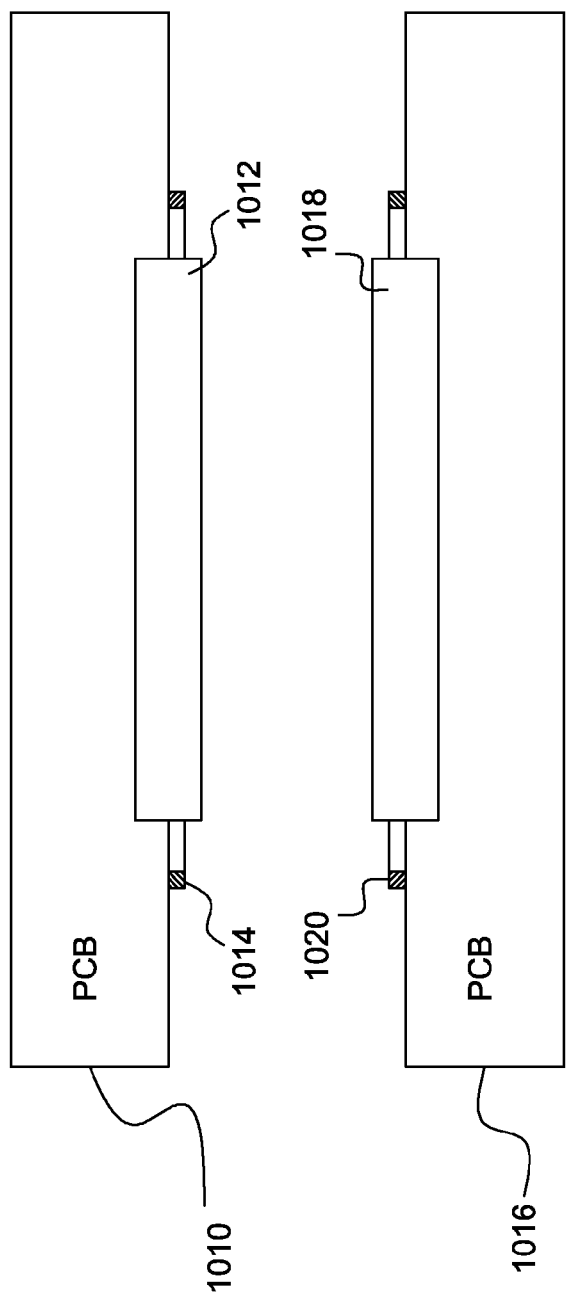
Figure 10C:
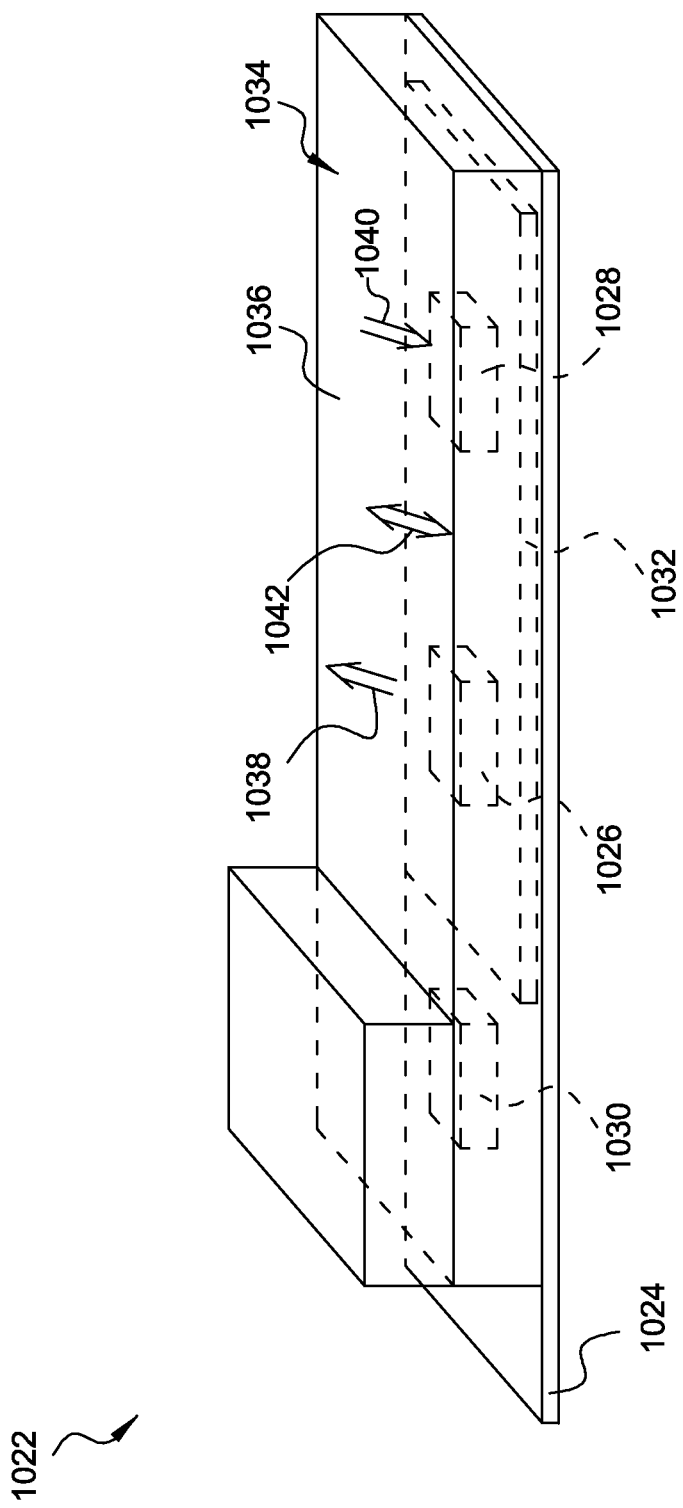
Figure 10D:
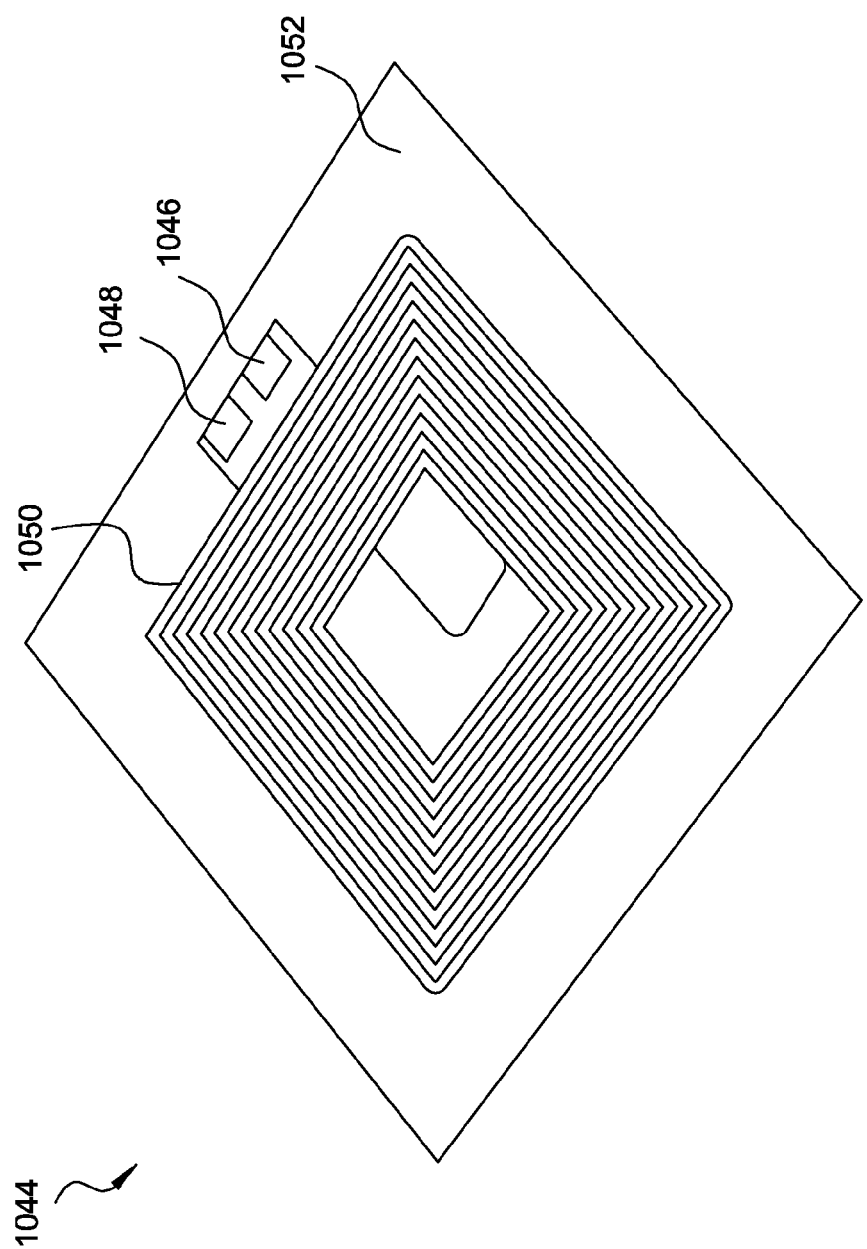
Figure 12:
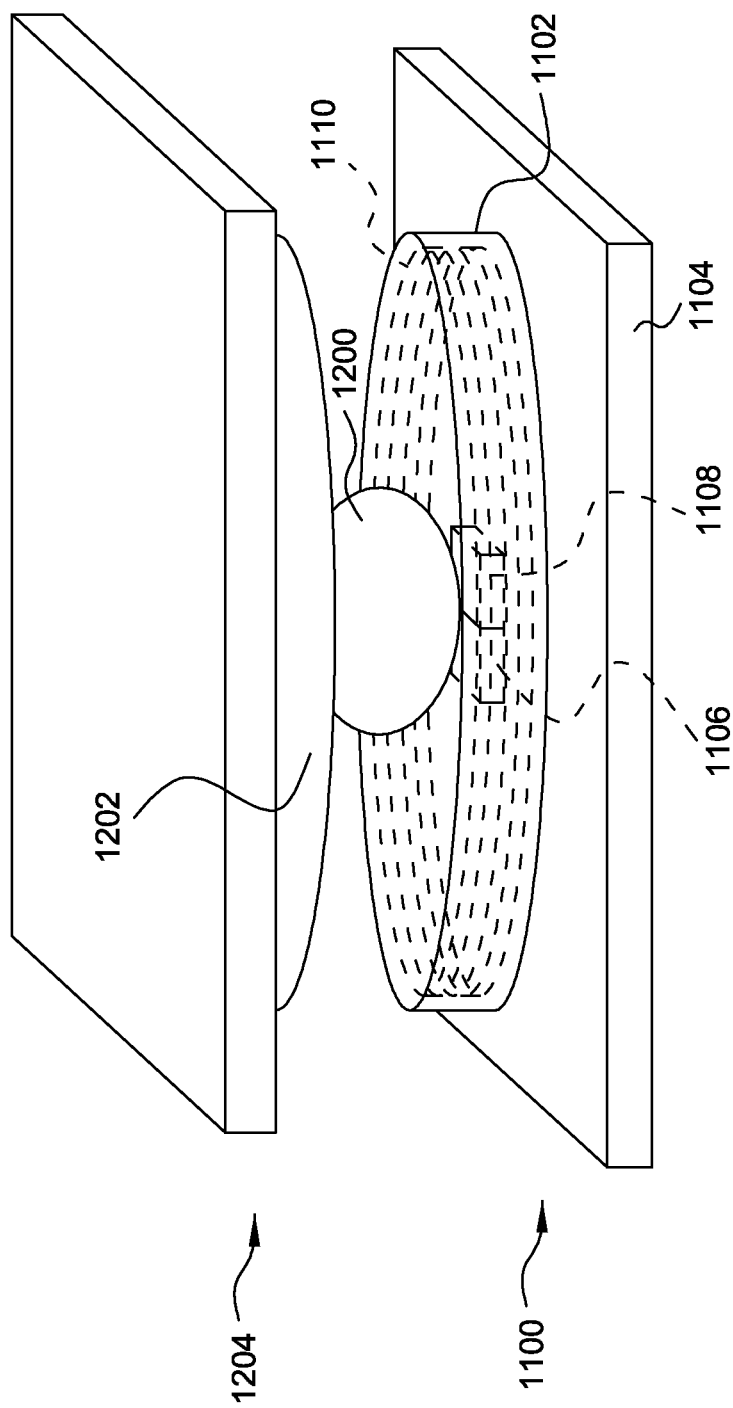
Figure 13A:
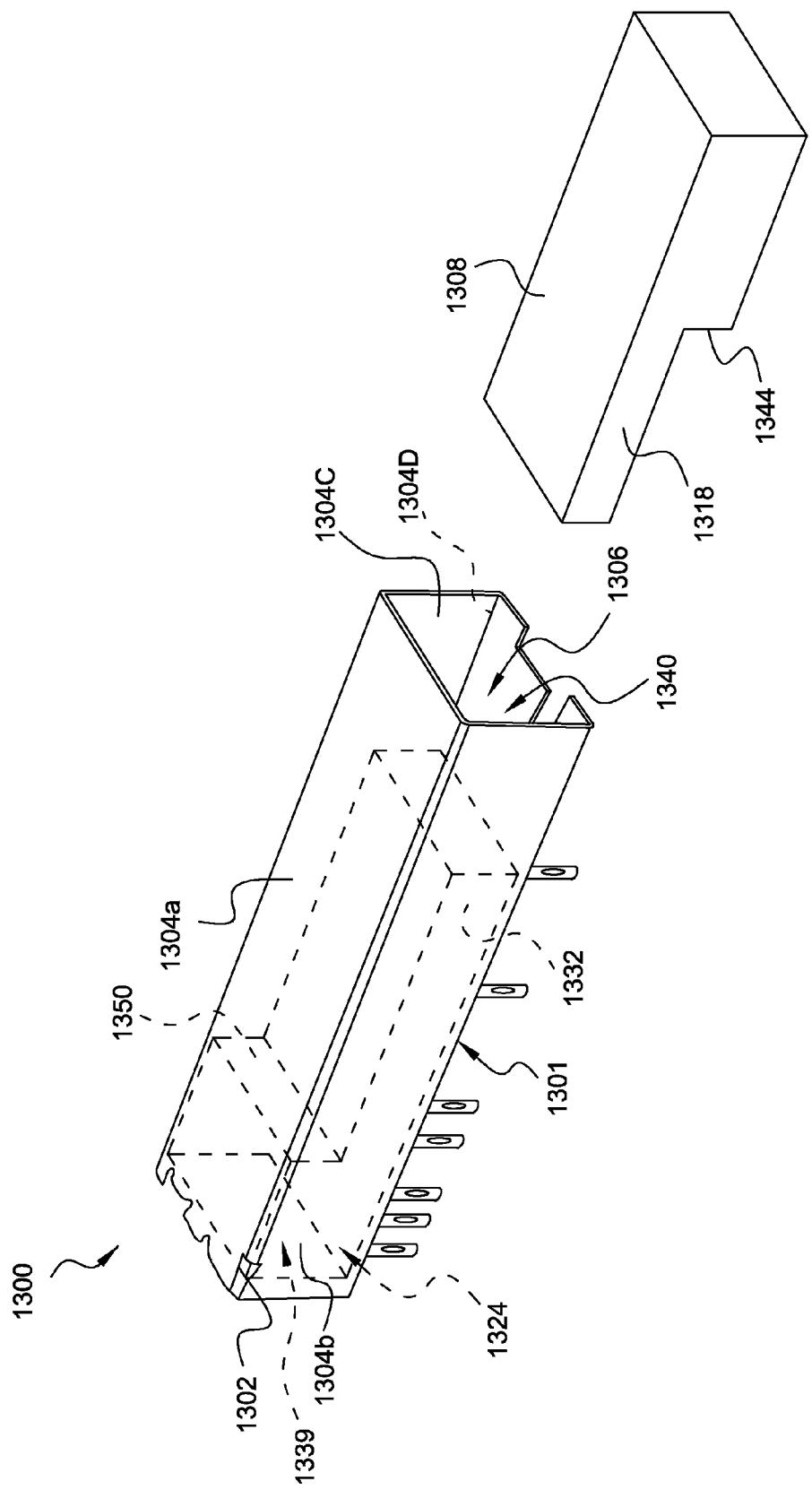
Figure 13B:
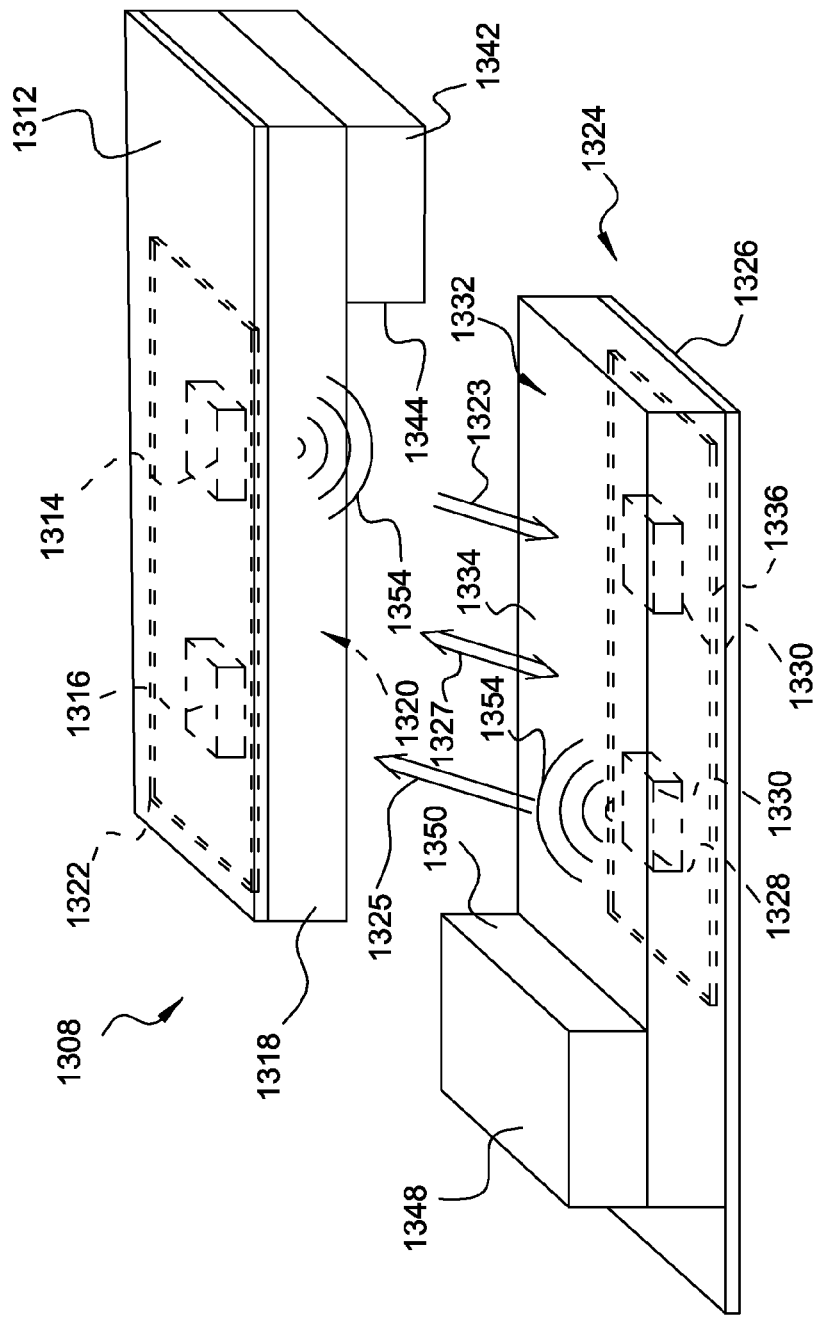

FIG. 5 illustrates an example of a power transfer circuit which can be implemented in an electronic device;

FIG. 6 is a block diagram of an example of a first electronic module communicating with a second electronic module;

FIG. 7 illustrates a flowchart for an example of a method of encoding and transmitting a composite data signal;

FIG. 8 illustrates a flowchart for an example of a method of receiving and decoding a composite data signal;

FIG. 9 illustrates an exemplary block diagram of a transmitter and receiver that may be used in a small form factor pluggable (SFP) chip;

FIG. 10A illustrates a top view of an example of a SFP chip;

FIG. 10B illustrates a cross sectional view of the SFP chip of FIG. 10A;

FIG. 10C illustrates an isometric view of a SFP chip;

FIG. 10D illustrates a SFP chip embedded on a flexible medium;

FIG. 11 illustrates an exploded view of a SFP chip;

FIG. 12 is a schematic view of an example of a wireless EHF communication link between two SFP chips;

FIG. 13A is a schematic view of an example of a cage enclosing a mating assembly of a first electronic insert and a second electronic insert; and FIG. 13B is a schematic view of the first electronic insert and the second electronic insert that can be enclosed in the cage of FIG. 13A.

There may be additional structures described in the description that are not depicted in the drawings, and the absence of such a drawing should not be considered as an omission of such design from the specification.

DETAILED DESCRIPTION

Before describing embodiments in detail, it should be observed that the embodiments may utilize apparatus components and method steps related to electronic devices capable of EHF communication. Accordingly, the apparatus components have been represented where appropriate by conventional symbols in the drawings, showing specific details that are pertinent for an understanding of the present disclosure so as not to obscure the disclosure with details that will be readily apparent to those with ordinary skill in the art having the benefit of the description herein.

It is to be understood that the disclosed embodiments are merely exemplary of the claimed elements, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure or method. Further, the terms and phrases used herein are not intended to be limiting but rather to provide an understandable description of the subject matter.

Furthermore, in today's society and computing environment, electronic devices are being used increasingly. Methods and apparatus using EHF communication may provide secure, stable, and high-bandwidth communication between and within these devices.

An example of an EHF communications unit is an EHF communication link chip. Throughout this disclosure, the terms communication link chip, communication link chip package, and EHF communication link chip package will be used to refer to EHF transducers embedded in IC packages. A transducer may be any suitable structure configured to convert between electrical and electromagnetic signals. In some embodiments, a transducer is an antenna. Examples of such communication link chips are described in detail in U.S. Patent Application Publication Nos. 2012/0307932, 2012/0263244, 2012/0286049, and 2013/0070817, all of which are hereby incorporated in their entireties for all purposes. Communication link chips are an example of a communication device, also referred to as communication unit, whether or not they provide wireless communication and whether or not they operate in the EHF frequency band.

Wireless communication may be used to provide signal communications between components or modules in a device or may provide communication between devices. Wireless communication provides an interface that is not subject to mechanical and electrical degradation. Examples of systems employing wireless communication between chips are disclosed in U.S. Pat. No. 5,621,913 and U.S. Published Patent Application No. 2010/0159829, the disclosures of which are incorporated herein by reference in their entirety for all purposes.

In one example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the strength of the transmitted energy, and the first conduction path and the second conduction path may be discontinuous with respect to each other. In exemplary versions, the transmitter and receiver may be disposed on separate circuit carriers positioned with the transducers of the transmitter/receiver pair in close proximity.

A transmitter or receiver may be configured as an IC package, in which a transducer may be positioned adjacent to a die and held in place by a dielectric or insulating encapsulation or bond material. A transmitter or receiver may be configured as an IC package, in which a transducer may be positioned adjacent to a die and held in place by encapsulation material of the package and/or a lead frame substrate.

These IC packages, along with contactless power transfer methods, may be used to create modular components for electronic devices. Because modules can thus transfer data and power without contacts, each module may be self-contained, and may be environment-proofed. Modules may be assembled and disassembled with ease, even by hand, as no complicated and/or easily-damaged connectors are used in assembly. The modules may be configured with magnets or clips to connect to each other in one or more configurations. In this fashion, modules may be field-swapped to repair or upgrade, and complicated final assembly steps may be eliminated. Customization by the user may be facilitated. By using the short-range EHF IC packages to provide communication, relaxed module alignment requirements may be facilitated due to the relatively tolerant EHF coupling characteristics of the IC packages. Exposed metal may be eliminated as well, resulting in better wear characteristics and enabling capabilities such as waterproofing.

FIG. 1 illustrates a system 100 for wireless communication between electronic devices. The system 100 may include a first electronic device 102 and an external second electronic device 104. The electronic device 102 and the external electronic device 104 may be capable of communicating with each other. Examples of the electronic device 102 and the external electronic device 104 include but may not be limited to a mobile phone, a computer, a laptop, a personal digital assistant (PDA), a smartphone, smart power systems such as wirelessly charged batteries, a desktop computer, a television and a gaming console. The electronic device 102 may include a data signal circuit 106, an auxiliary circuit 108 and an extremely high frequency (hereinafter EHF) wireless transceiver 112. Similarly, the external electronic device 104 may include an EHF wireless transceiver 114, a data signal circuit 116 and an auxiliary circuit 118.

The auxiliary circuit 108 and the auxiliary circuit 118 may provide an operative function to the electronic device 102 and the external electronic device 104, respectively. In an example, the auxiliary circuit 108 and the auxiliary circuit 118 may be circuits associated with peripheral and/or human interface devices of the electronic device 102 and the external electronic device 104, respectively. Examples of the peripheral devices include but may not be limited to a keyboard and a mouse.

In another embodiment of the present disclosure, the auxiliary circuit 108 and the auxiliary circuit 118 may be circuits associated with some other components of the electronic device 102 and the external electronic device 104, respectively. Examples of the other components include but may not be limited to an embedded processor. Both, the auxiliary circuit 108 and the auxiliary circuit 118 may produce a low frequency data signal. However, for the sake of simplicity, the auxiliary circuit 108 of the electronic device 102 may be taken as a source of a first low frequency data signal. Examples of low frequency data signals may include control signals and the like which may have a low frequency rate.

The auxiliary circuit 108 may be coupled to the data signal circuit 106. The data signal circuit 106 may encode a first composite data signal with the first low frequency data signal produced by the auxiliary circuit 108 and an input first base high frequency data signal. The base high frequency data signals may be high frequency signals and may include video data signals, audio data signals, and network data signals. The composite signals may be a combination of data and control or information signals. For example, in case of TV broad casting, a video signal may not be transmitted alone, but it is accompanied by a number of other signals or pulses, which help the exact reproduction of the picture at the receiving end. These pulses include blanking pulses, synchronizing pulses and equalizing pulses. In this case, a combination of picture signal and other control signals or pulses may be combined in a composite signal. Thus, a composite video signal may consist of picture information, data blanking pulses and delay pulses (Vertical and Horizontal Synchronizing Pulses).

Accordingly, the EHF wireless transceiver 112 may transmit the encoded composite data signal to the EHF wireless transceiver 114 through an EHF communication link 110 established between the electronic device 102 and the external electronic device 104. For example, a transmitting transducer of the EHF wireless transceiver 112 may transmit the encoded composite data signal to a receiving transducer of the EHF wireless transceiver 114 through the wireless EHF communication link 110. The wireless EHF communication link 110 may be established when the EHF wireless transceiver 112 of the electronic device 102 is aligned sufficiently with the EHF wireless transceiver 114 of the external electronic device 104 at an appropriate position and may carry the signals transmitted by the EHF wireless transceiver 112 to the EHF wireless transceiver 114 or vice-versa.

In an example, the auxiliary circuit 108 may be a power transfer circuit 202 (shown is FIG. 2) for generating power control signals and transferring contactless power from the electronic device 102 to the external electronic device 104. Similarly, the auxiliary circuit 118 may be a power transfer circuit 204 (shown is FIG. 2) for receiving contactless power according to the instructions embedded in the power control signals produced by the power transfer circuit 202 from the electronic device 102.

It may be noted that the power transfer circuit 202 may have the capability to not only transfer power and generate power control signals but also receive power (according to power control signals) from the external electronic device 104. On the same note, the power transfer circuit 204 may have the capability to not only receive power and generate power control signals but also transmit power (and generate power control signals) to the electronic device 102. In addition, the power transfer circuit 202 may generate power control signals to control the amount of power that may be transferred to the external electronic device 104 and vice versa. In other embodiments, the alignment of the power transducer (inductive loops) may be sufficiently constrained due to the alignment requirements of the EHF communication system such that no control signals will need to be transferred between the respective power transfer circuits in order to control power transfer. Furthermore, the alignment requirements of the EHF communication system may constrain the alignment of the wireless power system and subsequently optimize power transfer efficiency, and alternatively, when the alignment requirements of the EHF communication system are not met, the wireless power system can be deactivated, thereby eliminating the need for alternative power safety systems.

In a communication system 300 shown in FIG. 3, an electronic device 302 may include auxiliary circuit 108, data signal circuit 106, and the EHF wireless transceiver 112. The auxiliary circuit 108 may generate a low frequency data signal 304 (such as power control/management signals, human interface device signals, and the like). In addition, a base high frequency data signal 306 may be provided to an amplifier 308 from a circuit separate from the electronic device. The low frequency data signal may or may not be associated with the electronics device 102. The low frequency data signal has a lower frequency bit rate than the first base high frequency data signal. The amplifier 306 may amplify the received base high frequency data signal 306 prior to inputting it into the data signal circuit. The low frequency data signal 304 may also be input into the data signal circuit. The data signal circuit 106 may encode the received base high frequency data signal 306 and the low frequency data signal 304 into a composite data signal 310 that then may be fed into the EHF wireless transceiver 112. The EHF wireless transceiver 112 may transmit the composite data signal 310 through the Wireless EHF communication link 110 to the EHF wireless transceiver 114 of the external electronic device 312.

The transmitted encoded composite data signal may have a predefined rate of carrier modulation. In an example, the digital signal circuit may send the composite data signal 310 to the EHF wireless transceiver 112 at a first composite bit rate. The EHF wireless transceiver 112 may maintain a predefined rate of carrier modulation such that the bit rate at which data is transmitted over the wireless EHF communication link 110 may be at a bit rate corresponding to the bit rate of the encoded composite data signal 310. As mentioned above, the low frequency data signal 304 may have a lower frequency bit rate than the base high frequency data signal 306.

The digital signal circuit 106 may create encoded composite data signal 310 so as to maintain a rate of carrier modulation that is in a bandwidth of the base high frequency data signal 306 encoded according to a predetermined standard coding protocol. The digital signal circuit may encode the information carried in the base high frequency data signal 306 and the low frequency data signal 304 into a longer string to scramble the data. In addition, the digital data circuit may encode the signals to limit the carrier modulation applied to the carrier signal. For example, if carrier frequency 'f' is modulated with a signal of frequency 'b' then the modulated signal may use a band of frequencies between 'f−b' and 'f+Fb'. The difference between the smallest and the largest frequencies may be called the bandwidth. Thus, limiting the carrier modulation may enable efficient utilization of the bandwidth.

Various custom or standard coding schemes may be used in the digital signal circuit 106 to expand the base high frequency data signal 306 to a longer data stream including the low frequency data signal 304 and the base high frequency data signal 306. In an embodiment of the present disclosure, the final bit rate may be kept at a higher carrier frequency to transmit the base high frequency data signal 306 at at-least the same data rate as received. For example, the EHF transceiver 112 of the first electronic device 302 may transmit the encoded composite data signal 310 at a first composite bit rate that may be as high or higher than the bit rate of the base high frequency data signal. However, the low frequency data signal 304 may be provided at a lower modulation frequency because low frequency data signal 304 has a lower bit rate.

Following the receiving of composite data signal 310 by transceiver 114, data signal circuit 116 in the external electronic device 312 may decode the composite data signal 310 and may provide the decoded signal to an amplifier 314. The amplifier 314 may amplify the decoded composite data signal 310 to produce a predetermined set of signal parameters, including but not limited to voltage swing, slew rate, and timing jitter. The decoding means 312 in the external electronic device 104 may decode the composite data signal into the low frequency data signal and the base high frequency data signal and may communicate the low frequency data signal to the auxiliary circuit 118.

It may be noted that, in one example, auxiliary circuit 108 may be power transfer circuit 202 illustrated in FIG. 2, in which case the low frequency data signal is a power transfer management or control signal. Correspondingly, auxiliary circuit 118 power transfer circuit 204. In this case, digital signal circuit 116 decodes the power transfer management or control signal from the received composite data signal for input to power transfer circuit 204.

Data signal circuit 106 of the electronic device 102 or 302 may be referred to as first data signal circuit which may encode a first composite data signal 310. However, those skilled in the art will appreciate that the external electronic device 104 or 312 may transmit and encode a composite data signal and the electronic device 102 or 302 may receive the encoded composite data signal. This encoded composite data signal may be referred to as second composite data signal. In this embodiment, a second data signal circuit may decode the second composite data signal, which may enable the management of power transfer in the power transfer circuit 202.

In an example, a base high frequency data signal 304 may be high frequency data signal and may carry the information including audio data, video data, files and the like. The low frequency data signal 302 may include at least one of the control signals generated by the power transfer circuit 202, the device-related information associated with an auxiliary circuit, such as a data signal of a keyboard, a mouse, encryption keys, and the like, or a low frequency data signal associated with other components (say an embedded processor) of the electronic device 102. The data from low frequency data signal 302 may be transmitted at a lower frequency than the base high frequency data signal 304.

The composite data signal 310 may be formed by merging the low frequency data signal 302 with the base high frequency data signal 304. Moreover, the merging may be done by incorporating the low frequency signal in bits added when the high frequency data signal is encoded according to a coding protocol to form the composite data signal 310. The composite data signal 310 thus may be formed to transmit both the low frequency data signal 302 and the base high frequency data signal 304 on the same Wireless EHF communication link 110. The transmission of the low frequency data signal 302 along with the base high frequency data signal 304 may facilitate utilization of unused emissions spectrum in the carrier wave. Furthermore, the encoded composite data signal 310 may be used to modulate a carrier signal transmitted on the Wireless EHF communication link 110.

In another embodiment, already-encoded base high-speed data 306, such as 8B/10B can be received as encoded words by amplifier 308. The term "high-speed" is intended in this context to be synonymous with the term "high frequency." The top data signal in FIG. 4A represents an example of encoded base high-speed data. The received base high-speed data words 306 can be applied to data signal circuit 106 for re-coding the base high-speed words based on the state of the low-speed data signal, such as the base low-speed data signal illustrated in FIG. 4A. A composite signal as illustrated in this figure may then be produced.

Examples of re-coding could include, but are not limited to, altering the running disparity of 8B/10B data or translating properly encoded words to alternate words. An example of this approach is illustrated in FIG. 4B. In this example, a base low-speed data signal is incorporated within the protocol of the high-speed data without altering the rate from the original high-speed base signal. One example is to use the running disparity that is natively built into 8B/10B coding to flip the running disparity based on the state of the low-speed base signal to produce the composite data signal.

FIG. 4C illustrates an exemplary functional diagram of a communication system 400, including an EHF transmitting unit 402 communicating with an EHF receiving unit 404 over an EHF communication link 110. In the transmitter, a register 406 of a data signal circuit, such as data signal circuit 106, receives a high-speed data signal as 8B/10B encoded words. An override circuit 408 then modifies the encoded words by overriding the running disparity by encoding the low speed data into the coding. The resulting encoded composite data signal may be used to modulate a carrier signal in an EHF wireless transmitter 410 that then transmits it on the Wireless EHF communication link 110.

In addition, the encoded composite data signal transmitted over EHF communication link 110 may be received by an EHF wireless receiver 412 of EHF receiving unit 404. The received signal 310 may then be coupled to a decoding circuit 414 of a data signal circuit, such as data signal circuit 116, to detect discrepancies in the received signal coding and extract the running disparity of the composite signal. Those discrepancies may be used to produce the low-speed data signal for auxiliary circuit 118. A Restore circuit 416 may then use the detected coding discrepancies to restore the high-speed data signal to its original form for transmission by amplifier 314.

FIG. 5 illustrates a power transfer circuit 502 that may be an example of power transfer circuit 202 or 204. The power transfer circuit 502 may inductively charge battery or other charge storage device of the external electronic device 104 and may generate power control signals to control the amount of power to be transferred by controlling the amount of power input to power transfer circuit 502. In an example, the various components in the power transfer circuit 502 may include a mated transformer 504, a power input terminal 506, a cascode configuration of MOS or bipolar transistors 508 making up an oscillator circuit 510, a shut off circuit 512, a varactor 514, a rectifier bridge 516, a filtering capacitor 518, a feedback circuit 520 for controlling varactor 514, and a power output terminal 522. Feedback circuit 520 includes a bandgap reference circuit 524 connected to an inverting input of a comparator 526. The bandgap reference circuit may be controllable by power management or control signals to vary the power output to the inductive coils connected to power output terminal 522.

The power input 506 may provide the power that is transferred by the power transfer circuit 502. The mated transformer 504 may be the combination of a primary coil and a secondary coil. The primary coil may conduct the alternating current as input on the power input terminal 506 and inductively induces a varying current in the secondary coils. The cascoded cross-coupled pair oscillator uses inductance of the transformer and tuning capacitors between the input and nodes p and p' to set a center frequency. The cascode configuration increases the breakdown voltage to handle voltage doubling. The peak-to-peak amplitude at nodes P and P' is about double the voltage applied at the power input terminal. The differential topology helps to cancel spikes in current draw in the power input. The shutoff circuit grounds the gates of the cascoded transistors when it senses a change in frequency or amplitude due to the absence of the secondary coil of the transformer.

The varactor and transformer form a resonant circuit nominally tuned to a power carrier frequency. The full-wave rectifier bridge 516 rectifies the oscillating waveform and the filtering capacitor 518 smoothes it. Feedback circuit 520 compares the output voltage with a reference voltage from the bandgap circuit 524 and adjusts the varactor toward or away from the design frequency to control the signal amplitude at nodes S and S'.

It may be noted that other power transfer circuits may produce or be controlled by a low frequency power control data signal. In addition, FIG. 1 and FIG. 2 illustrate communication between two electronic devices; however, those skilled in the art would appreciate that separate electronic modules within an electronic device may also communicate via a wireless EHF communication link 110.

For example, FIG. 6 illustrates communication between two modules of an electronic device 602. The electronic device 602 may include a first electronic module 604, and a second electronic module 606. The communication may take place between the first electronic module 604 and the second electronic module 606 over the wireless EHF communication link 110. The first electronic module 604 may include the data signal circuit 607, an EHF wireless transmitter 608 and the power transfer circuit 609.

Similarly, the second electronic module 606 may include an EHF wireless receiver 610, a data signal circuit 614 and a power transfer circuit 616. Further, the power transfer circuit 6092 may include inductive power coils 622 and a power control module 612 to induce power in the second electronic device 606 and to control the amount of power transferred to the second electronic device 606. The data signal circuit 607 may encode the base high frequency data signal 304 and the low frequency control signal 302, which in this case is a power transfer control signal, to be transmitted to the second electronic module 606. The encoded composite data signal 310 may be transmitted by the EHF wireless transmitter 608 through the wireless EHF communication link 110 to the EHF wireless receiver 610 and may be decoded. The low frequency control signals 302 generated by decoding the encoded composite signals 310 may be used to control the inductive power transfer via the inductive power coils 618 and the inductive power coils 622.

FIG. 7 illustrates a flowchart 700 for concurrently transferring power and transmitting data from the first electronic device 102 to the external electronic device 104. The flowchart starts at step 702. At step 704, as mentioned above, the auxiliary circuit 108 may produce the first low frequency data signal 304. At step 706, the data signal circuit 106 may receive the first low frequency data signal and the first base high frequency data signal. At step 708, the composite data signal 310 may be encoded with the low frequency data signal 304 and the base high frequency data signal 306 to maintain a predefined rate of carrier modulation. The low frequency data signal 304 has a lower frequency data bit rate than the base high frequency data signal 306. Following step 708, at step 710, the encoded composite data signal 310 may be transmitted over the wireless EHF communication link 110 to the external electronic device 104. Further, the predefined rate of carrier modulation maintains that bit rate at which data is received by the external electronic device 104 is at least the same as the bit rate of the input base high frequency data signal. Furthermore, the rate of carrier modulation is maintained to consume an emission spectrum corresponding to a bandwidth of the encoded base high frequency data signal 306. During communication between the electronic devices, the EHF wireless transceiver 112 of the electronic device 102 and the EHF wireless transceiver 114 of the external electronic device 104 are sufficiently aligned so as to establish the wireless EHF communication link 110. The flowchart terminates at step 712.

FIG. 8 illustrates a flowchart 800 illustrating concurrently transferring power and data between the external electronic device 104 and the first electronic device 102. The flowchart starts at step 802. At step 804, as mentioned above, the EHF wireless transceiver 114 receives the composite data signal 310 encoded with the low frequency data signal 304 and the base high frequency data signal 306 over the wireless EHF communication link 110. At step 806, the data signal circuit 116 decodes the second encoded composite data signal into the low frequency data signal 304 and the base high frequency data signal 306. At step 808, the auxiliary circuit 118 may receive the decoded low frequency data signal 304. The flowchart terminates at step 810.

FIG. 9 illustrates a communication system 900, including a small form factor (SFP) transmitter chip 902 and a SFP receiver chip 904. The data signal circuit 106, the auxiliary circuit 108 and the EHF wireless transceiver 112 (or a transmitter) of the electronic device 102 explained above in the description of FIGS. 1-8, may be in the form of a SFP chip. Similarly, the EHF wireless transceiver 114, the data signal circuit 116 and the auxiliary circuit 118 of the external electronic device 104 may also be in the form of a SFP chip. These SFP chips may be formed in a single chip package for communication with another electronic device over a wireless EHF communication link 110. For example, as shown in FIG. 9, SFP chips 902 and 904 may be embedded in the electronic device 102 or in the external electronic device 104, to function as a transceiver. In some examples, an electronic device may include only SFP chip 902 as a transmitter or only SFP chip 904 as a receiver.

the SFP chip 902B may include an amplifier 906 that receives an input transmit base high frequency data signal and outputs the amplified data signal to a data signal circuit 908. Data signal circuit 908 may also be coupled to a transmit power transfer circuit interface 910 that is coupled to a power transfer circuit as has been described. The Data signal circuit, in this example, is also connected to an I2C interface 912, that in turn is coupled to an I2C management circuit, not shown, As has been discussed, a low frequency power control data signal may be communicated between data signal circuit 908 and the power transfer circuit via the power transfer circuit interface. Similarly, a low frequency data signal may be communicated between an auxiliary circuit, not shown, and data signal circuit 908. Data signal circuit 308 may then encode the low frequency data signals and the base high frequency data signal to form an encoded composite data signal that is fed to a wireless EHF transmitter 914. The transmitter in turn transmits the encoded composite data signal by modulating a carrier signal with the data signal and transmitting it on a transducer 916. In some examples, transducer 916 is an antenna.

Similarly, the SFP receiver chip 904 may include a transducer 918 that receives an electromagnetic EHF signal transmitted by another electronic device on a transducer 918. The received EHF signal is input to a wireless EHF receiver 920, which demodulates the received signal to produce a received encoded composite data signal. The received encoded composite data signal is then input into a receive data signal circuit 921. The receive data signal circuit then decodes the received encoded composite data signal to produce a base high frequency data signal, a low frequency power control data signal, and a low frequency data signal. The low frequency power control data signal is output to the power transfer circuit via a receive power transfer interface 922. Correspondingly, the low frequency data signal is output to the auxiliary circuit via an I2C interface 924. The decoded high frequency data signal is amplified by an amplifier 926 for output to a separate circuit of device connected to receive SFP chip 904.

It may be noted that the transmit SFP chip 902 and the receive SFP chip 904 may be implemented in existing electronic devices in combination with existing components. For example, as shown in FIG. 10A, a top view of the SFP power and data chip 1000 is shown. Power and data chip 1000 may include a SFP EHF communication chip 1002, a power transfer circuit chip 1004, inductive power coils 1006 and a power input 1008. The inductive power coils 1006 may receive the power from the power input 1008 and may inductively transfer power to an inductive power coil of another electronic device. As shown in FIG. 10B, the SFP chip 1012 may be mounted on a printed circuit board 1010 (hereinafter PCB 1010). Inductive coils 1014 may surround SFP chip 1012. Another electronic device may have a corresponding PCB 1016 on which is mounted a SFP chip 1018 surrounded by inductive coils 1020.

In a further example, as shown in FIG. 10C, an electronic module 1022 may include a first PCB 1024. An EHF wireless transmitter chip 1026 and an EHF wireless receiver chip 1028 may be disposed on the PCB 1024. In addition, a power transfer circuit chip 1030 and associated inductive power coils 1032 may also be mounted on PCB 1024. Again, transmitter chip 1026 and receiver chip 1028 may be surrounded by the power coils. A dielectric cover 1034 mounted on the PCB 1024 and covering and extending along the chips and power coils, may define an interface surface 1036. The EHF wireless transceiver 1026 may transmit and receive EHF wireless signals along respective signal pathways 1038 and 1040 extending through the dielectric cover 1034 and the first inductive power coil 1032 may receive or transmit power along a power pathway 1042 extending through the first dielectric cover 1318.

In another example shown in FIG. 10D, an electronic module 1044 may include an SFP transceiver chip 1046 and a power transfer circuit chip 1048, along with associated inductive power coils 1050 may be mounted on a flexible tape 1052.

In an example, as shown in an exploded view in FIG. 11, a an electronic module 1100 may include a dielectric cover 1102 mounted on a PCB 1104 to define an interface surface 1103 extending along an EHF wireless transceiver of a SFP transceiver chip 1106 and a power transfer circuit 1108 with associated inductive power coils 1110.

In another example, as shown in FIG. 12, an electronic module 1100, having the elements described with reference to FIG. 11, with the SFP chips 1106 and 1108 mounted on the PCB 1104 may establish the wireless EHF communication link 1200 with respective SFP chips enclosed in a dielectric cover 1202 of another electronic module 1204.

In another example shown in FIGS. 13A and 13B, a mating assembly 1300 may include a cage 1301 that that retains one or both of first electronic insert 1308 and second electronic insert 1324 in mutual alignment. In the example shown, cage 1301 may be a frame 1302 having four side elements 1304a, 1304b, 1304c, 1304d defining a channel 1306 enclosed by the side elements. In this example, the side elements are substantially continuous, surrounding channel 1306. It will be appreciated that the side elements may be discontinuous and may be of any configuration that sufficiently restrains relative movement of electronic inserts 1308 and 1324 when disposed in respective portions of channel 1306. The mating assembly 1300 may include first electronic insert 1308 positioned shown positioned outside an end of cage 1301. Second electronic insert 1324 is shown positioned in the frame 1302 and in contact with portions of each of the three side elements 1304b, 1304c and 1304d. With second electronic insert positioned within the cage 1300, the first electronic insert 1308 may be inserted into the portion of channel 1306 adjacent to the second electronic insert 1324 by moving the first electronic insert into the channel and along the second electronic insert. The relative positions of the two inserts are illustrated in exploded view in FIG. 13B. When the first electronic insert 1308 is positioned in the frame 1302, it is in contact with portions of three of each of the side elements 1304a, 1304b and 1304c.

The first electronic insert 1308 and the second electronic insert 1324 may each include a SFP chip mounted on a PCB. It may be noted that the functionality and various components of the SFP chip mounted on the PCB which may form a part of the first electronic insert 1308 and the second electronic insert 1324 may be as described for the SFP chip 902 and/or the SFP chip 904.

As shown in FIG. 13B, the first electronic insert 1308 may include a first PCB 1312. A first EHF wireless transmitter chip 1314 and a first EHF wireless receiver chip 1316 may be disposed on the first PCB 1312. In addition, a first dielectric cover 1318 mounted to the first PCB 1312 may define an interface surface 1320 extending along first EHF wireless transmitter chip 1314, first EHF wireless receiver chip 1316, and a first inductive power coil 1322. The first EHF wireless transmitter 1314 may transmit EHF wireless signals along a first signal pathway 1323 extending through the dielectric cover 1318. Similarly, the first EHF wireless receiver chip 1316 may receive EHF wireless signals along a second signal pathway 1325 extending through the dielectric cover 1318. Also, the first inductive power coil 1322 may receive or transmit power along a first power pathway 1327 extending through the first dielectric cover 1318.

Similarly, the second electronic insert 1324 may include a second PCB 1326. A second EHF wireless transmitter chip 1328, a second EHF wireless receiver chip 1330, and second inductive power coils 1336 may be disposed on the second PCB 1326. A second dielectric cover 1332 may be mounted to the second PCB 1326 and may define a second interface surface 1334 extending along the second EHF wireless transmitter chip 1328, the second EHF wireless receiver chip 1330, and the second inductive power coil 1336. The second EHF wireless transmitter chip 1328 may be configured to transmit EHF wireless signals along signal pathway 1325 extending through the second dielectric cover 1332. The second EHF wireless receiver chip 1330 may be configured to receive EHF wireless signals along signal pathway 1323 extending through the second dielectric cover 1332. Additionally, the second inductive power coil 1336 may be configured to receive or transmit power along power pathway 1327 extending through the second dielectric cover 1332.

As shown in FIG. 13, the frame 1302 and the first dielectric cover 1318 may define a portion 1339 of the channel 1306 into which the second electronic insert is positioned for communication and power transfer with the first electronic insert 1308. In addition, at least one of the frame 1302 and first electronic insert 1308 may form a first protrusion 1342 defining a first end position 1344 for the second electronic insert 1324 when the second electronic insert 1324 may be positioned in the portion 1340 of the channel 1306.

On the same lines, as shown, at least one of the frame 1302 and second electronic insert 1324 may have a second protrusion 1348 defining a second end position 1350 for the first electronic insert 1308 when the first electronic insert 1308 may be positioned in the portion 1340 of the channel 1306, as shown in FIG. 13B.

The first protrusion 1342 may restrict movement of the second electronic insert 1324 relative to the first electronic insert 1308 and vice versa. The movement of the first electronic insert 1308 and the second electronic insert 1324 may be restricted so that the first EHF wireless transmitter chip 1314 and the second EHF wireless receiver chip 1330 are aligned and fixed sufficiently to establish a wireless EHF communication link 1354. In this position, the second EHF wireless transmitter chip 1328 and the first EHF wireless receiver chip 1316 are aligned, as are inductive coils 1322 and 1336. The alignment may enable communication and efficient power transfer between the respective relevant components of the first electronic insert 1308 and the second electronic insert 1324.

The examples disclosed above may allow chips packages to be produced with low chip count, low board area requirements, low total cost of the system, and the like. In addition, the disclosed examples may enable high bandwidth data transfer. Further, transmit and receive chips may be mated together so as to establish one or more EHF communication links without needing complex circuitry to determine whether there are suitable proximity and alignment between components to initiate and maintain data and/or power transfer between electronic devices. Moreover, the present disclosure may allow efficient utilization of the available bandwidth on the EHF communication link.

It will also be apparent from the foregoing description that in one example, a mating assembly, may comprise:

a frame defining four side elements defining a channel; and a first electronic insert positioned in the frame and in contact with at least portions of three of the side elements, the first electronic insert comprising:

a first printed circuit substrate;

a first extremely high frequency (EHF) wireless transceiver coupled to the first data signal circuit disposed on the first printed circuit substrate; and a first dielectric cover mounted to the first printed circuit substrate and defining an interface surface extending along the first EHF wireless transceiver and the first inductive power coil, the first EHF wireless transceiver being configured to transmit and receive EHF wireless signals along a first signal pathway extending through the dielectric cover and the first inductive power coil being configured to receive or transmit power along a first power pathway extending through the first dielectric cover, the frame and the first dielectric cover defining a portion of the channel into which a second electronic insert is positioned for communication and power transfer with the first electronic insert, at least one of the frame and the first electronic insert comprising a first protrusion defining a first end position for the second electronic insert when the second electronic insert is positioned in the portion of the channel.

Such a mating assembly may further comprise:
a second electronic insert positioned in the frame and in contact with at least portions of three of the side elements, the second electronic insert comprising:
a second printed circuit substrate;
a second EHF wireless transceiver coupled to the second data signal circuit and disposed on the second printed circuit substrate; and
a second dielectric cover mounted to the second printed circuit substrate and defining a second interface surface extending along the second EHF wireless transceiver and the second inductive power coil, the second EHF wireless transceiver being configured to transmit and receive EHF wireless signals along a second signal pathway extending through the second dielectric cover and the second inductive power coil being configured to receive or transmit power along a second power pathway extending through the second dielectric cover.

In some examples of a mating assembly, at least one of the frame and second electronic insert comprise a second protrusion defining an end position for the second electronic insert when the second electronic insert is positioned in the channel.

In some mating assemblies, when the second electronic insert is positioned against the first protrusion, the first electronic insert and the second electronic insert are positioned so that the first and second EHF wireless transceivers are aligned sufficiently to establish the EHF communication link.

In some examples of a mating assembly, the first protrusion restricts movement of the second electronic insert relative to the first electronic insert.

In some examples, the first electronic insert further includes a first power transfer circuit including a first inductive power coil disposed on the first printed circuit substrate and the second electronic insert includes a second power transfer circuit including a second inductive power coil disposed on the second printed circuit substrate, and when the second electronic insert is positioned against the first protrusion, the first electronic insert and the second electronic insert are positioned so that the first and second inductive power coils are sufficiently aligned to accommodate power transfer between the first and second inductive power coils.

In some examples, the first electronic insert further includes a first data signal circuit coupled to the first power transfer circuit; wherein the first power transfer circuit produces a low-frequency power-transfer-control signal and the first data signal circuit encodes a composite data signal with the low-frequency power-transfer-control signal and an input base high frequency data signal.

In some mating assemblies, the first EHF wireless transceiver transmits the encoded composite data signal over the EHF communication link.

In some examples, a mating assembly comprises:
a frame defining four side elements defining a channel;
a first electronic insert positioned in the frame and in contact with at least portions of three of the side elements;
a second electronic insert positioned in the frame, wherein each of the first electronic insert and the second electronic insert comprise:
a printed circuit substrate;
a power transfer circuit including an inductive power coil disposed on the printed circuit substrate;
a data signal circuit disposed on the printed circuit substrate; and
an extremely high frequency (EHF) wireless transceiver disposed on the printed circuit substrate; and
a dielectric cover mounted to the printed circuit substrate and defining an interface surface extending along the EHF wireless transceiver and the inductive power coil, the EHF wireless transceiver being configured to transmit and receive EHF wireless signals along a signal pathway extending through the dielectric cover and the inductive power coil being configured to receive or transmit power along a power pathway extending through the dielectric cover;
wherein the first electronic insert and the second electronic insert are positioned for communication and power transfer with one another.

In some examples of such a mating assembly, at least one of the frame and the first electronic insert further include a first protrusion defining a first end position for the second electronic insert when the second electronic insert is positioned in the channel.

In some examples of mating assemblies, at least one of the frame and the second electronic insert further include a second protrusion defining a second end position for retaining the second electronic insert relative to the first electronic insert in the channel.

In some examples of a mating assembly, each power transfer circuit produces a low-frequency power-transfer-control signal and the associated data signal circuit encodes a composite data signal with the low-frequency power-transfer-control signal and an input base high frequency data signal.

In some examples of mating assemblies, each EHF wireless transceiver transmits the encoded composite data signal over the EHF communication link.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. An electronic device comprising:
an auxiliary circuit producing a first low frequency data signal;
a first data signal circuit coupled to receive the first low frequency data signal from the auxiliary circuit and a first base high frequency data signal from an amplifier, and configured to generate an encoded first composite signal by incorporating the first low frequency data signal in bits added to the first base high frequency data signal when the first base high frequency data signal is encoded according to a coding protocol; and
an extremely high frequency (EHF) wireless transmitter coupled to transmit the encoded first composite data signal from the first data signal circuit over a first wireless EHF communication link to an external device, the transmitted encoded first composite data signal having a predefined rate of carrier modulation.

2. The electronic device of claim 1, wherein the auxiliary circuit is a power transfer circuit configured to produce a first low frequency power management signal as the first low frequency data signal.

3. The electronic device of claim 2, wherein the first low frequency power management signal is a low frequency control signal used in the control of power transfer between the electronic device and the external device.

4. The electronic device of claim 1, wherein the EHF transmitter receives the encoded first composite data signal at a first composite bit rate and maintains the predefined rate of carrier modulation such that a bit rate at which data is transmitted over the first wireless EHF communication link is at a bit rate corresponding to the bit rate of the encoded first composite data signal.

5. The electronic device of claim 1, wherein the first low frequency data signal is associated with the electronic device and has a lower frequency bit rate than the first base high frequency data signal.

6. The electronic device of claim 1, wherein the first low frequency data signal is not associated with the electronic device and has a lower frequency bit rate than the first base high frequency data signal.

7. The electronic device of claim 1, further comprising:
an EHF wireless receiver for receiving an encoded second composite data signal with a second low frequency data signal and a second base high frequency data signal over a second wireless EHF communication link from the external device;
a second data signal circuit coupled to a second auxiliary circuit for decoding the second encoded composite data signal into the second low frequency data signal and the second base high frequency data signal, and communicating the second low frequency data signal to the second auxiliary circuit.

8. The electronic device of claim 7, wherein the second auxiliary circuit is a contactless power transfer circuit configured to receive the second low frequency data signal as a first low frequency power management signal.

9. The electronic device of claim 7, wherein the second low frequency data signal and the second base high frequency data signal have respective bit rates, and the second low frequency data signal is associated with the electronic device and has a lower frequency bit rate than the bit rate of the second base high frequency data signal.

10. The electronic device of claim 7, wherein the second low frequency data signal and the second base high frequency data signal have respective bit rates, and the second low frequency data signal is not associated with the electronic device and has a lower frequency bit rate than the second base high frequency data signal.

11. An electronic device comprising:
an extremely high frequency (EHF) wireless receiver to receive an encoded composite data signal from an external device over a EHF communication link, the encoded composite data signal formed by incorporating a low frequency data signal in bits added to a base high frequency data signal when the base high frequency data signal is encoded according to a coding protocol;
a first data signal circuit coupled to the EHF wireless receiver and configured to decode the encoded composite data signal into the low frequency data signal and the base high frequency data signal; and
an auxiliary circuit coupled to receive the decoded low frequency data signal.

12. The electronic device of claim 11, wherein the auxiliary circuit is a contactless power transfer circuit responsive to the low frequency data signal for controlling operation of the contactless power transfer circuit.

13. The electronic device of claim 11, wherein the decoded base high frequency data signal has a first data bit rate, and the EHF receiver receives the first encoded composite data signal at a second bit rate that is at least as high as the first data bit rate.

14. The electronic device of claim 11, wherein the low frequency data signal is associated with the electronic device and has a lower frequency bit rate than the base high frequency data signal.

15. The electronic device of claim 11, wherein the low frequency data signal is not associated with the electronic device and has a lower frequency bit rate than the base high frequency data signal.

16. An electronic device, comprising:
a first power transfer circuit including an inductive coil for providing contactless power transfer between the electronic device and an external device, the power transfer being controlled by a first low-frequency power control signal produced or received by the first power transfer circuit;
a first circuit module configured to receive the first low frequency power control signal produced by the first power transfer circuit and an input base high frequency data signal, the first circuit module comprising:
a first data signal circuit configured to generate an encoded first composite data signal using the first low-frequency power control signal and the input base high frequency data signal; and
an extremely high frequency (EHF) wireless transmitter for transmitting over a first wireless EHF communication link the encoded first composite data signal to the external device, the transmitted encoded first composite data signal having a predefined rate of carrier modulation; and
a second circuit module configured to output a second low frequency power control signal and an output base high frequency data signal, the second circuit module comprising:
an EHF wireless receiver for receiving an encoded second composite data signal over a second wireless EHF communication link from the external device, the encoded second composite data signal comprising the second received low frequency power control signal and the output base high frequency data signal;

a second data signal circuit coupled to a second power transfer circuit for decoding the encoded second composite data signal into the second low frequency power control signal and the output base high frequency data signal, and communicating the second low frequency power control signal to the second power transfer circuit.

17. The electronic device of claim 16, wherein an input base high frequency data signal has a data bit rate that is higher than a data bit rate of the first low-frequency power control signal.

18. The electronic device of claim 16, wherein the EHF transmitter receives the encoded first composite data signal at a first composite bit rate and maintains the predefined rate of carrier modulation such that a bit rate at which data is transmitted over the first wireless EHF communication link is at a bit rate corresponding to the bit rate of the encoded input base high frequency data signal.

19. The electronic device of claim 16, wherein the first low frequency power control signal has a lower data bit rate than a data bit rate of the input base high frequency data signal.

20. The electronic device of claim 16, wherein the first data signal circuit encodes the first composite data signal so as to maintain a rate of carrier modulation that is in a bandwidth of the input base high frequency data signal encoded according to a predetermined standard coding protocol.

21. A method comprising:
producing a first low frequency data signal by an auxiliary circuit;
receiving by a first data signal circuit the first low frequency data signal and a first base high frequency data signal;
generating an encoded composite data signal by incorporating the first low frequency data signal in bits added to the first base high frequency data signal when the first base high frequency data signal is encoded according to a coding protocol; and
transmitting over a first wireless extremely high frequency (EHF) communication link the encoded first composite data signal to an external device, the transmitted encoded first composite data signal having a predefined rate of carrier modulation.

22. The method of claim 21, where the auxiliary circuit is a contactless power transfer circuit, and wherein producing the first low frequency data signal includes producing a first low frequency power management signal as the first low frequency data signal for controlling power transfer between the electronic device and the external device.

23. The method of claim 21, further comprising receiving by an EHF transmitter the encoded first composite data signal at a first composite bit rate and maintaining the predefined rate of carrier modulation such that a bit rate at which data is transmitted over the first wireless EHF communication link is at a bit rate corresponding to at least as high as the bit rate of the encoded first base high frequency data signal.

24. The method of claim 21, wherein producing a first low frequency data signal includes producing the first low frequency data signal with a lower frequency bit rate than a bit rate of the first base high frequency data signal.

25. The method of claim 21, further comprising:
receiving an encoded second composite data signal with a second low frequency data signal and a second base high frequency data signal over a second wireless EHF communication link from the external device; and
decoding the encoded second composite data signal into a second low frequency data signal and a second base high frequency data signal; and
communicating the decoded second low frequency data signal to the auxiliary circuit.

26. The method of claim 25, where the auxiliary circuit is a contactless power transfer circuit, the method further comprising controlling the transfer of power based on the received second low frequency data signal.

27. The method of claim 25, wherein communicating the decoded second low frequency data signal includes communicating the decoded second low frequency data signal with a lower frequency bit rate than a bit rate of the second base high frequency data signal.

* * * * *